US009677587B2

(12) United States Patent
Changsrivong et al.

(10) Patent No.: US 9,677,587 B2
(45) Date of Patent: Jun. 13, 2017

(54) MULTI-LATCHING MECHANISMS AND RELATED METHODS

(71) Applicant: BAL SEAL ENGINEERING, INC., Foothill Ranch, CA (US)

(72) Inventors: Derek Changsrivong, Foothill Ranch, CA (US); Bill Nissim, Foothill Ranch, CA (US); Rafael Godinez, Foothill Ranch, CA (US); Pere Pla-Junca, Foothill Ranch, CA (US); Hugh Cook, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 592 days.

(21) Appl. No.: 13/693,296

(22) Filed: Dec. 4, 2012

(65) Prior Publication Data
US 2013/0149031 A1    Jun. 13, 2013

Related U.S. Application Data

(60) Provisional application No. 61/568,536, filed on Dec. 8, 2011.

(51) Int. Cl.
*F16B 21/18* (2006.01)
*H01R 13/187* (2006.01)
*F16B 17/00* (2006.01)

(52) U.S. Cl.
CPC ............ *F16B 17/00* (2013.01); *F16B 21/186* (2013.01); *Y10T 29/49826* (2015.01); *Y10T 403/7075* (2015.01)

(58) Field of Classification Search
CPC ........ F16B 21/16; F16B 21/18; A61N 1/3752; H01R 13/187; H01R 13/6277
See application file for complete search history.

(56) References Cited

U.S. PATENT DOCUMENTS 4,240,654 A * 12/1980 Gladieux ................. 285/276
4,678,210 A *  7/1987 Balsells ................... 285/318
(Continued)

FOREIGN PATENT DOCUMENTS

| CN | 101740965 A | 6/2010 |
| CN | 101981329 A | 2/2011 |
| EP | 2 259 383 A1 | 12/2010 |
| GB | 2 194 298 A | 3/1988 |
| WO | WO 03/067713 A1 | 8/2003 |

OTHER PUBLICATIONS

Examiner's Report on corresponding foreign application (CN Application No. 201210526590.2) from the State Intellectual Property Office dated Nov. 3, 2015.
(Continued)

*Primary Examiner* — Michael P Ferguson
(74) *Attorney, Agent, or Firm* — Klein, O'Neill & Singh, LLP

(57) ABSTRACT

Dual directional latch devices or connectors are described wherein a first connector component and a second connector component have a first latched position and a second latched position when moving in a first direction and wherein movement in a second direction is also possible depending on a stop feature. As described, a combination key and key way, a movable sleeve, a stop flange, and a threaded sleeve may be provided to stop movement in the second direction. The dual direction latch devices may be used with articles of manufacture such as with implantable medical devices, door panels, airplane panels, and drilling devices, to name a few.

8 Claims, 17 Drawing Sheets

(56) References Cited

U.S. PATENT DOCUMENTS

| | | | |
|---|---|---|---|
| 4,872,710 | A | 10/1989 | Konecny et al. |
| 5,791,930 | A | 8/1998 | Tabata et al. |
| 6,638,098 | B2 | 10/2003 | Yamaoka |
| 6,725,096 | B2 | 4/2004 | Chinn |
| 6,913,480 | B2 | 7/2005 | Wilcox |
| 7,914,315 | B2 | 3/2011 | Kuhn |
| 8,052,459 | B2 | 11/2011 | Smith et al. |
| 2002/0122690 | A1 | 9/2002 | Poon et al. |
| 2004/0005802 | A1 | 1/2004 | Lamirey |
| 2008/0254670 | A1 | 10/2008 | Balsells et al. |
| 2008/0255631 | A1 | 10/2008 | Sjostedt et al. |
| 2009/0208307 | A1* | 8/2009 | Guyton ............... 411/82 |
| 2010/0090379 | A1* | 4/2010 | Balsells ........... F16B 21/18 267/1.5 |
| 2013/0149029 | A1* | 6/2013 | Changsrivong et al. ..... 403/361 |

OTHER PUBLICATIONS

Extended European Search Report dated May 15, 2013 from corresponding European Application No. 12195851.6 (9 pages).
Extended European Search Report from related European Patent Application No. 10005812.2 (6 pages).
Notice of Allowanced dated Dec. 4, 2012 from related U.S. Appl. No. 13/239,153.
Office Action dated Sep. 14, 2012 from related U.S. Appl. No. 13/239,153.
Office Action dated Apr. 14, 2011 from related U.S. Appl. No. 12/792,648.
Notice of Allowance dated Aug. 31, 2011 from related U.S. Appl. No. 12/792,648.

* cited by examiner

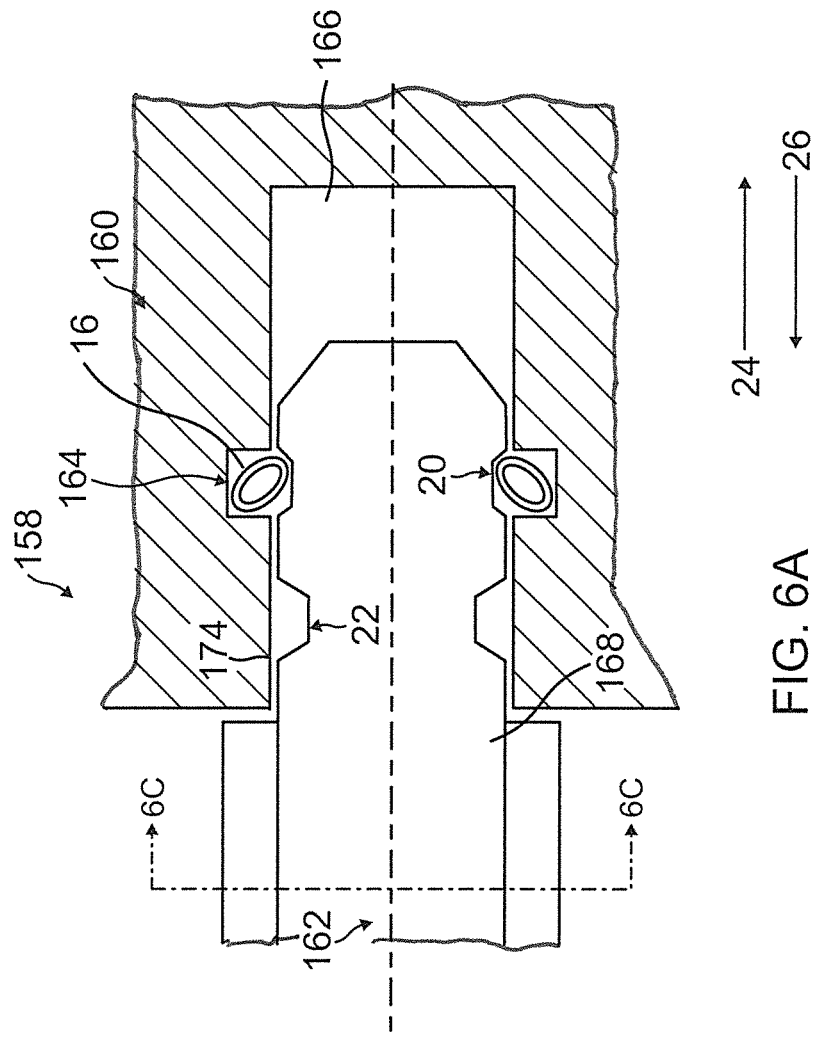
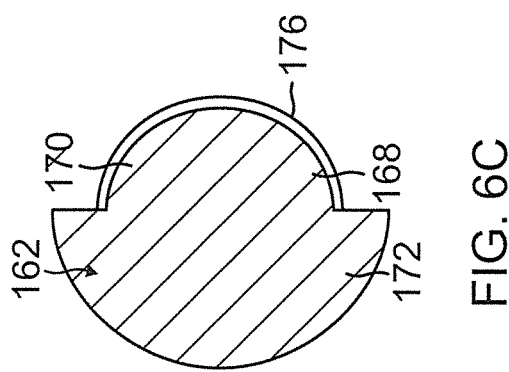

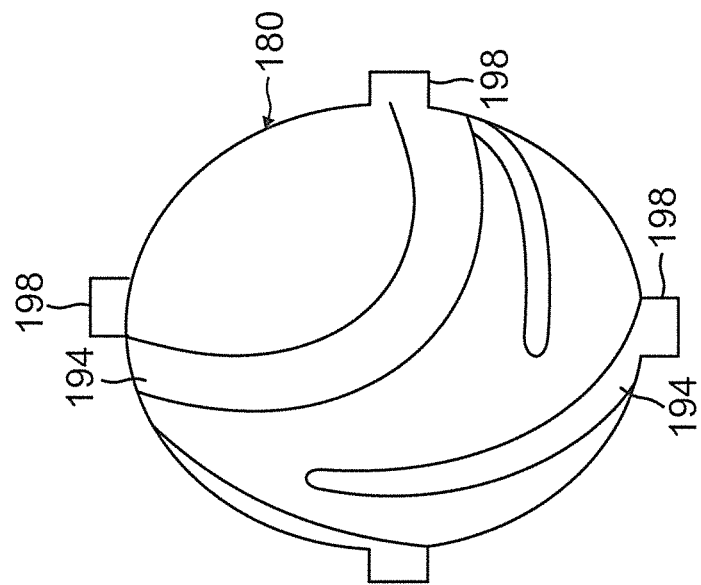
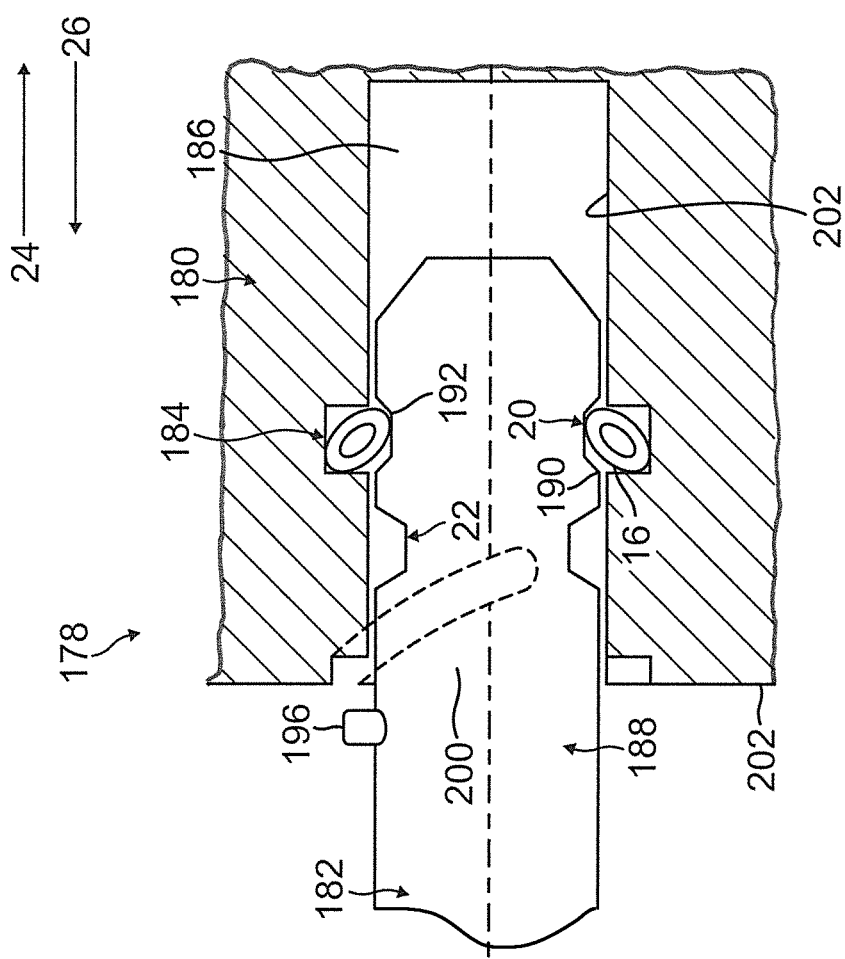
FIG. 7A
FIG. 7B

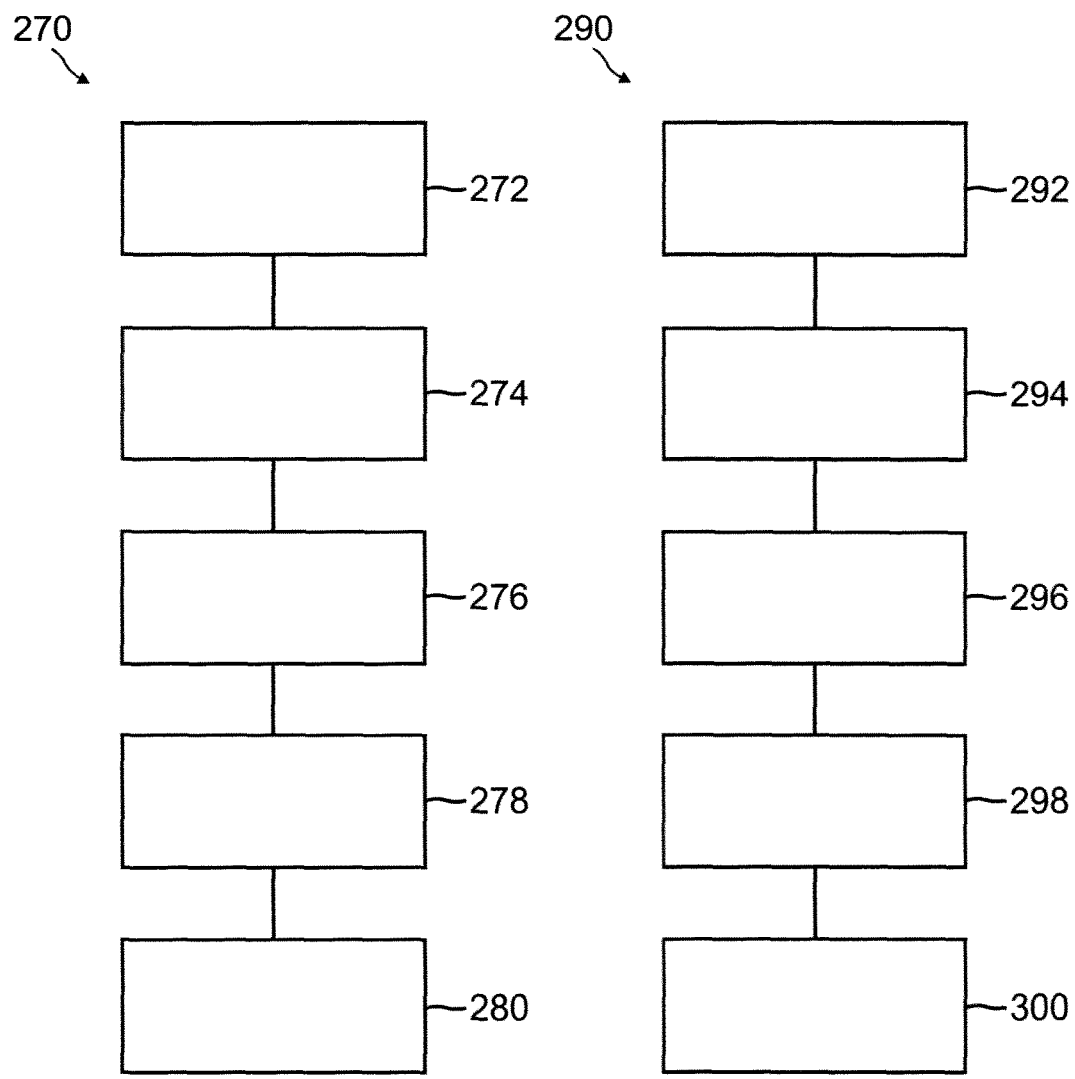

MULTI-LATCHING MECHANISMS AND RELATED METHODS

CROSS-REFERENCE TO RELATED APPLICATION

This is a regular utility application of provisional application Ser. No. 61/568,536, filed Dec. 8, 2011, the contents of which are expressly incorporated herein by reference. This application may be related to and expressly incorporates by reference application Ser. No. 13/239,153, filed Sep. 21, 2011, the contents of which are expressly incorporated herein by reference.

FIELD OF ART

Latching and locking devices and related methods are generally discussed herein with specific discussions extended to latching devices that latch when inserted in a first direction and locks when withdraws in a second direction but that when further inserted in the first direction, permits latching in the second direction. The devices and methods are capable of dual-directional latching. Further aspects of the present devices and methods include stop features, such as a flange, a pin, threads, alignment slots, etc., for limiting further insertion in the first direction until the stop features are removed or overcome, which then permits latching in the second direction.

BACKGROUND

Conventional connection mechanisms utilize a canted coil spring and specific groove geometries between a first connector component and a second connector component, such as a housing and a pin, to achieve locking or latching, see, for example, U.S. Pat. Nos. 4,678,210 and 5,082,390. In the case of a locking device, the device becomes permanently locked, which means the device cannot reverse direction without permanently damaging the canted coil spring. In the case of a latching device, the device can be unlatched, i.e., reverse direction, without damaging the spring. This is permitted by incorporating a groove geometry that allows the minor axis of the spring to compress so that it no longer obstructs relative movement between the first connector component and the second connector component.

Locking is achieved between two mating parts (e.g., cylindrical part or shaft and a housing) where a tapered bottom groove exists in the housing and holds an axial spring and where the tapered bottom groove aligns with a corresponding groove on the cylindrical part which accepts the spring. The tapered bottom groove is configured in such a way that the spring compresses along the minor axis upon insertion to permit installation but not upon removal when moving in the reverse direction. Because the spring does not compress along the major axis upon removal, due to its position within the groove, it does not unlatch and remain locked. The spring is instead forced to compress along the major axis when attempting to remove the cylindrical part, which does not materially or significantly compress, to ensure locking. As such, removal of a "locker" device causes permanent damage to the spring if forced to disassemble. Again, this is due to the characteristic of a canted coil spring only being allowed a minimal compression along the major axis.

SUMMARY

The present device, system, and method make it possible for a locking connection to be disconnected when moving in the opposite direction from the insertion or installation direction, which previously was not possible without damaging the spring, as discussed above. In one example, the device, system, and method include incorporating or providing a sufficiently deep secondary groove in addition to a primary groove to allow the canted coil spring to move to the secondary groove and then rotate back to its relaxed vertical position. Unlike when in the primary groove, the spring is not held when in the secondary groove against rotation and has room to rotate in the opposite direction that it experienced during insertion. The leading edge of the secondary groove makes contact with the canted coil spring and rotates it thus allowing for removal of the canted coil spring from the secondary groove and back into the first groove, but being rotated for removal or unlocking. Here the canted coil spring is orientated so that the cylindrical part can be completely unlatched.

The present disclosure is further directed to a connector comprising a first connector component mated with a second connector component. A groove is located in or on the first connector component or the second connector component and two grooves, i.e., a pair of grooves are located in or on the other one of the first connector component or the second connector component. The groove has at least one of a bottom wall and two tapered side walls. The pair of grooves comprises a first groove having a first depth and a second groove having a second depth, which differs from the first depth, such as being deeper relative to a connector centerline. A canted coil spring is positioned in the first groove and the groove and loaded along its major axis, which limits removal of the first connector component from the second connector component without destroying the spring. Wherein a stop feature is provided to prevent the first connector component from moving relative to the second connector component to prevent the canted coil spring from moving to the second groove and the groove. The stop feature can be activated, removed, or severed to permit relative movement.

In an example, a stop feature is incorporated in the connector assembly for preventing movement of the spring into the secondary groove. This added stop feature may be desired to ensure purposeful locking so that unlocking may only occur when a positive step is taken to disable the stop feature and permit further movement of the spring into the secondary groove to enable spring rotation for subsequent unlocking or unlatching.

Thus, once the cylindrical part is inserted into the housing and engages the primary groove, the canted coil spring experiences a removal lock, i.e., it cannot be removed by moving the cylindrical part in the reverse direction without damaging the spring, also referred to as a single step lock. To unlock the assembly, essentially by converting a locking device into a latching device that permits unlocking or unlatching, the spring is rotated to permit reversal of the cylindrical part. In an example, the cylindrical part is further inserted into the housing, or the housing is move relative to the cylindrical part, in the same direction as the original direction for locking to permit spring rotation. During the further insertion step, the spring engages a secondary groove, which is larger than the primary groove. By larger, it is understood to mean wider, deeper, or both wider and deeper than the primary groove. Because the secondary groove is larger, the spring is not so constrained and permitted to rotate. Preferably, the secondary groove does not restrain the spring. From this point within the secondary groove, the device can be unlatched by moving the cylindrical part in the removal direction. Thus, the device is capable of dual directional latching with locking. An aspect of the present device, system, and assembly includes a stop feature that requires an affirmative step before moving in the second direction is permitted.

The combination primary and secondary grooves may optionally be incorporated in the housing or in the cylindrical part. In other words, the housing can have a single groove or two grooves and the pin can have the corresponding two grooves or single groove.

In addition to allowing dual directional latching with locking, the larger secondary groove following the primary groove can provide a lower removal force as compared to removal from the primary groove in latching applications. In other words, the force to move the spring from the secondary groove to separate the pin from the housing is lower than the force to move the spring when it is in the first groove and moving it in the same insertion direction.

Thus, once the cylindrical part is inserted into the housing and engages the primary groove, the canted coil spring experiences a removal lock. To unlatch, the cylindrical part is first inserted further into the housing. In one example, when the pin is further inserted, a secondary groove located on the pin moves into the housing so that the spring engages the secondary groove. In a specific example, the secondary groove is larger than the first groove. Once in the larger secondary groove, the spring is able to rotate and be unlatched by moving the cylindrical part in the removal direction, opposite the insertion direction. By larger, the groove can have a larger groove depth, a larger volumetric space, or both.

In an alternative embodiment, the first connector component and the second connector component each incorporates a single groove but still permit multiple latching configurations. In one example, a groove incorporated with the first connector component latches a spring with a groove incorporated with the second connector component in a first latched position. To move the spring to a second latched position, the groove in the first connector component or the second connector component is enlarged without moving the other connector component. For example, the second connector component can be held stationary while sections of the first connector component are disengaged to enlarge the groove on the first connector component. After the groove is enlarged, the spring is allowed to rotate and relax without translating the second connector component. Once the spring is allowed to relax in the now enlarged groove, the second connector component can reverse and retract away from the first connector component.

A still further feature of the present device, system, and method is understood to include a connector comprising a first connector component mated with a second connector component. A groove is provided in or on the first connector component or the second connector component and a pair of grooves is provided in or on the other one of the first connector component or the second connector component. The groove has two side walls and a bottom wall and the pair of grooves comprises a first groove having a first depth and a second groove having a second depth, which differs from the first depth. A canted coil spring is positioned in the first groove and the groove and is movable to be seated in the second groove and the groove and wherein a stop feature prevents the first connector component from moving relative to the second connector component to prevent the canted coil spring from being engaged by the second groove and the groove.

In an embodiment, the first connector component is a pin or a housing and the second connector component is the other one of the pin or the housing.

In another embodiment, the second connector component is attached to an article of manufacture.

In yet another embodiment, an implantable medical device is provided and wherein the first connector component is located in a header of the implantable medical device.

In yet another embodiment, the stop feature is a movable sleeve or a multi-part flange mountable over a shaft.

In yet another embodiment, the stop feature is a pin that is removable or rupturable or a threaded device.

In yet another embodiment, the stop feature comprises a key and a key way.

In yet another embodiment, a lumen is formed in the first connector component, the second connector component, or both the first and the second connector components.

In yet another embodiment, the stop feature is mechanically connected to the first connector component, the second connector component, or both the first connector component and the second connector component.

Aspects of the present disclosure further include a method of manufacturing a connector comprising forming a first connector component having a groove and forming a second connector component having a primary groove and a secondary groove. The method further includes sizing a first common groove between the groove and the primary groove with a first spring holding space and a second common groove between the groove and the secondary groove with a second spring holding space, which is larger than the first common groove. The method further includes the stop of forming a stop feature to limit relative movement between the first connector component and the second connector component. Wherein the first common groove is sized and configured to receive a canted coil spring and loading the canted coil spring along its major axis and wherein the second common groove is sized and configured to receive the canted coil spring and not load the spring along its major axis.

A further aspect of the present method of manufacturing a connector comprises the steps of forming a first connector component having a groove and forming a second connector component having a primary groove and a secondary groove. The method further comprises the step of sizing a first common groove between the groove and the primary groove with a first spring holding space and a second common groove between the groove and the secondary groove with a second spring holding space. In an example, the second common groove is larger than the first common groove. The method further includes the step of forming a stop feature to limit relative movement between the first connector component and the second connector component. In an example, the first common groove is sized and shaped to receive a canted coil spring and loading the canted coil spring along its major axis and wherein the second common groove is sized and shaped to receive the canted coil spring and allow the major axis to rotate.

In an embodiment, the method further includes the step of attaching an article of manufacture to the first connector component or the second connector component.

In an embodiment, the method further includes the step of placing the first connector component in a header of an implantable medical device.

In a further aspect of the present disclosure, a connector is provided comprising a housing comprising a bore and a housing groove having a housing groove configuration. The connector further including a pin comprising a pin groove having a pin groove configuration and a second groove located adjacent the housing groove or the pin groove, the second groove having a second groove configuration with a second groove depth that differs from the housing groove configuration and the pin groove configuration. The connector further comprising an axial canted coil spring disposed in the bore in a first spring position in a first common groove defined by a combination of the housing groove and the pin groove and is movable relative to the pin and the housing to a second common groove defined by a combination of the housing groove and the second groove or a combination of the pin groove and the second groove. Wherein a stop feature is provided to stop relative movement between the housing and the pin to stop the axial canted coil spring from moving to the second common groove.

A still further aspect of the present disclosure is a connector assembly. In an example, the connector assembly comprises a housing comprising a bore and a housing groove having a housing groove configuration and a pin comprising a pin groove having a pin groove configuration. The assembly further comprises a second groove located adjacent the housing groove or the pin groove, the second groove having a second groove configuration with a second groove depth that differs from the housing groove configuration and the pin groove configuration. A canted coil spring is disposed in the bore in a first spring position in a first common groove defined by a combination of the housing groove and the pin groove and is loaded generally along its major axis. The assembly permits the canted coil spring to be movable relative to the pin and the housing to a second common groove defined by a combination of the housing groove and the second groove or a combination of the pin groove and the second groove. In an example, the second common groove is larger than the first common groove to permit the spring to move, such as to rotate its major axis, relative to the pin and the housing. A stop feature is provided in abutting contact with the housing, the pin, or both the housing and the pin to limit relative movement between the housing and the pin to thereby limit the canted coil spring from moving to the second common groove. An article of manufacture is attached to the pin or the housing. The article of manufacture can be any number of components, structures or devices. For example, the article can be a panel on a car, train or an airplane or a frame for a seat or a chassis. The article can also be part of a medical device, such as a housing or an implantable device.

A still further aspect of the present device, system, and method is a dual directional connector and a method for manufacturing and using the dual directional connector. The structure of the connector comprising a first connector component mated with a second connector component. A groove is provided with the first connector component and a groove is provided with the second connector component. The combination of the groove of the first connector component and the groove of the second connector component define a common groove having a common groove shape and size. A canted coil spring is positioned in the common groove and loaded along the canted coil spring's major axis. In a preferred embodiment, the first connector component is formed with an inner first connector section and an outer first connector section that are movable relative to one another and wherein a recess is provided between the inner first connector section and the outer first connector section for increasing the size of the common groove when the inner first connector section is moved relative to the outer first connector section.

BRIEF DESCRIPTION OF THE DRAWINGS

The various embodiments of the present connectors, systems, and associated methods now will be discussed in detail with an emphasis on highlighting the advantageous features. These embodiments depict the novel and non-obvious connectors shown in the accompanying drawings, which are for illustrative purposes only. These drawings include the following figures, in which like numerals indicate like parts:

FIG. 6A shows a schematic cross-sectional side view of an alternative dual direction connector, which shows a second connector component moving into a bore of a first connector component and a stop feature preventing further advancement.

FIG. 6C is an end-view taken along line 6C-6C of FIG. 6A, which shows a shaped shaft section aligned with a corresponding shaped opening on the second connector component.

FIG. 7A shows a schematic cross-sectional side view of an alternative dual direction connector, which shows a second connector component moving into a bore of a first connector component and a stop feature preventing further advancement.

FIG. 7B is an end-view taken along line 7B-7B of FIG. 7A, which shows a shaped key aligned with helical thread portions formed on an interior surface of the first connector component.

FIG. 10 is a process flow diagram depicting a method of use of a connector assembly.

FIG. 11 is a process flow diagram depicting a method of manufacturing a connector assembly.

DETAILED DESCRIPTION

The embodiments of the present connectors, systems, and associated methods are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unit or a unitary piece and whereas a unitary piece means a singularly formed single piece, such as a singularly formed mold or cast. Still further, the terms "first" and "second" used herein are understood as identifiers only to distinguish between similar but different components. Thus, unless the context indicates otherwise, "first" and "second" are not limiting terms.

Figure 1A:
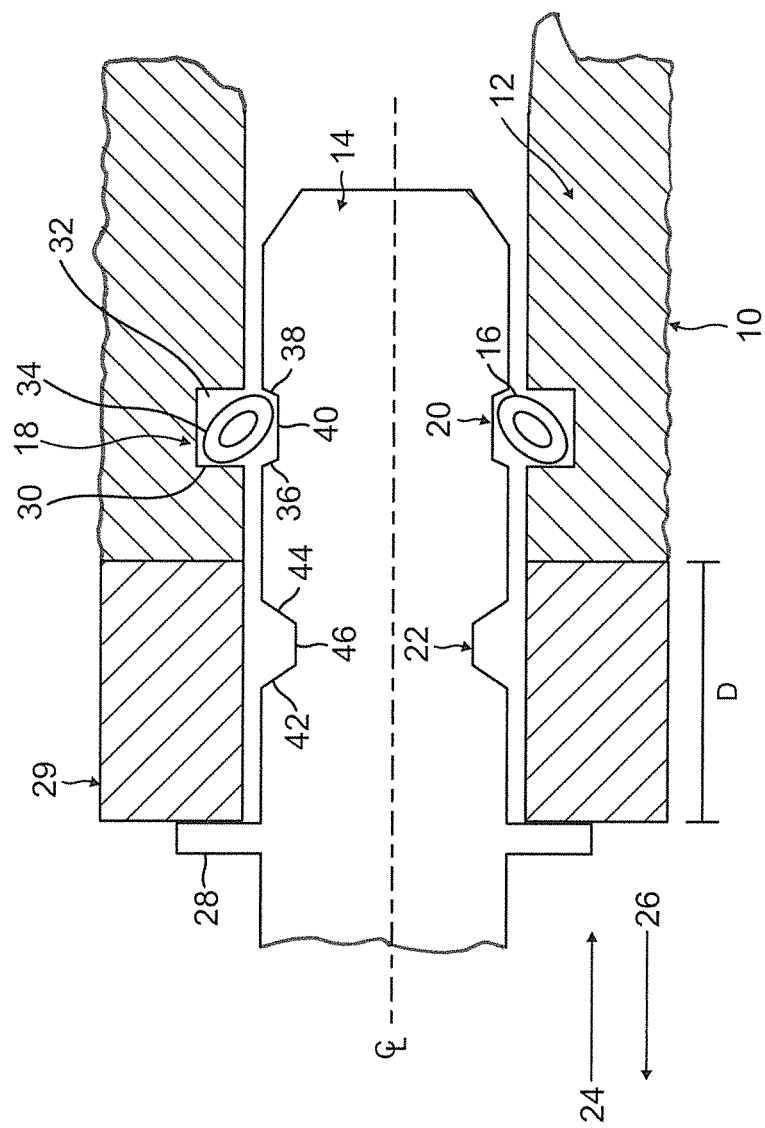
FIG. 1A shows a schematic cross-sectional side view of a dual direction connector, which shows a second connector component moving into a bore of a first connector component and a stop feature preventing further advancement.

FIG. 1A shows a partial cross-sectional side view of a connector provided in accordance with aspects of the present device, system, and method, which is generally designated 10. The connector comprises a first connector component 12, a second connector component 14, and a canted coil spring 16. The connector is generally symmetrical about a centerline ℄ of the second connector component 14. In one exemplary embodiment, the first connector component 12 is a housing comprising a housing groove 18 and the second connector component 14 is a cylindrical member or pin 14 comprising a primary pin groove 20 and a secondary pin groove 22, which is larger than the primary pin groove. By larger, it is understood to mean larger in width, in depth, or both width and depth. The distance between the primary pin groove 20 and the secondary pin groove 22 can vary depending on how deep the pin 14 is intended to be inserted to move the spring to the secondary pin groove 22, as further discussed below.

As shown in FIG. 1A, the first connector component 12 and the second connector component 14 are locked. The connector 10 is locked by moving the cylindrical member 14 in the first direction 24 so that the spring 16 is oriented as shown between the housing groove 18 and the primary groove 20 and the extended feature 28 on the secondary component 14 is obstructed from further moving in the first direction 24. In one example, the extended feature 28 is a flange located on the secondary component 14. In another example, the extended feature is a pin, a rod, or a sleeve mounted on or fabricated with the pin. As shown, the extended feature 28 is stopped by a stop feature 29, which is mounted over the secondary component 14 and abutted against the primary component 12. As further discussed below, the stop feature 29 may be a removable block configured to stop the secondary component 14 from moving in the first direction 24 to facilitate locking in the first direction and the second direction. As oriented n FIG. 1A, the spring 16 would necessarily compress along its major axis, i.e., the longer axis of the spring coils, to permit removal in the second direction 26. However, it is generally not possible to compress the spring along its major axis, i.e., the shorter axis of the spring coils, to provide sufficient clearance for removable of the pin without destroying the spring.

In one example, the housing groove 18 comprises two side walls 30, 32 and a bottom wall 34 located therebetween that is generally flat, i.e., generally orthogonal, to one or both side walls. However, the bottom wall 34 may be tapered or has a complex geometry relative to one or both side walls 30, 32. In an alternative embodiment, the housing groove 18 comprises two tapered side walls defining a V-groove with or without a flat bottom wall located between.

Like the housing groove 18, the primary pin groove 20 and the secondary pin groove 22 both have side walls 36, 38, 44, 46 and a bottom wall 40, 46. In one exemplary embodiment, the primary pin groove 20 comprises two tapered side walls 36, 38 that taper outwardly in the direction away from the centerline ℄ and a flat bottom wall 40. However, the side walls 36, 38 may be straight and the bottom wall 40 may be tapered without deviating from the spirit and scope of the present assembly and method. In another example, the bottom wall 40 is complex, i.e. having multiple surfaces with varying angles. The secondary groove 22 may have a similar groove configuration as the primary groove 20 with one exception, it is larger than the primary groove. By larger, the groove width, the groove depth, or both the depth and the width of the secondary groove are larger than the primary groove. As further discussed below, the larger secondary groove provides sufficient room for the spring to rotate to enable unlocking or unlatching.

Figure 1B:
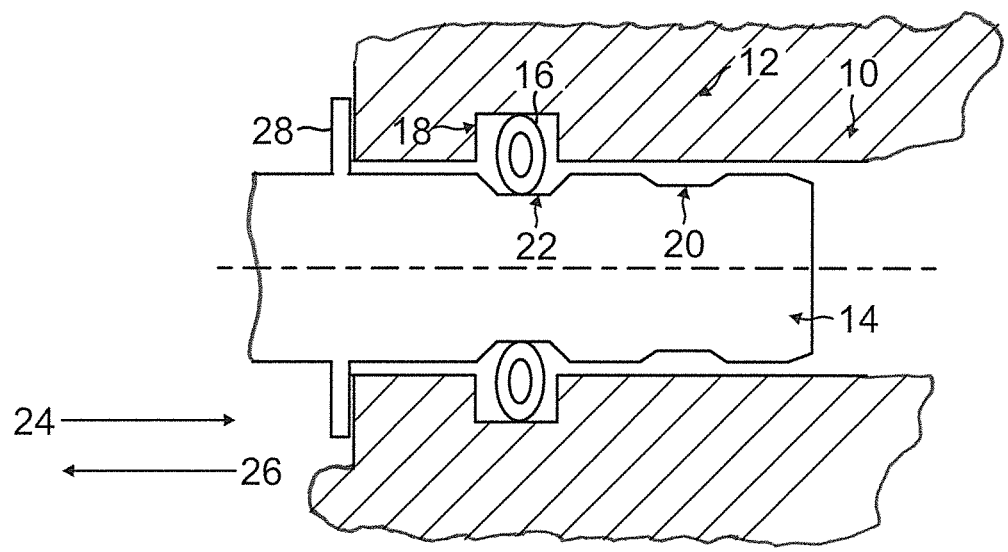
FIG. 1B shows a schematic cross-sectional side view of the dual direction connector of FIG. 1A with the stop feature removed to enable moving the second connector component further into the bore of the first connector component so that the spring is latched in a second latched position.

Refer now to FIG. 1B, a schematic cross-sectional side view of the connector assembly 10 of FIG. 1A is shown with the second connector component 14 further inserted into the first connector component 12 so that the spring 16 is now captured between the housing groove 18 and the secondary groove 22. The connector 10 is moved to the second position as shown in FIG. 1B, from the first position shown in FIG. 1A, by first removing the stop feature 29 (FIG. 1C) to provide space for the extended feature 28 to move in the first direction 24. In one example, the extended feature 28 may be adjusted, such as being slidable, along the secondary connector component 14 to ensure proper registry when capturing the spring 16 in the second position. In the relaxed second position, FIG. 1B, the spring 16 is permitted to rotate generally more vertically because of the larger secondary groove 22 compared to the relatively smaller primary groove 20. Once allowed to rotate to its relaxed position, the spring 16 can now be counter-rotated by moving the pin in the second direction 26 relative to the housing to unlock or unlatch the pin from the housing, as shown in FIG. 1E. In particular, the tapered side wall 44 of the secondary groove 22 pushes against the spring 16 to compress it along the minor axis, i.e. the shorter axis of the spring coils, during retraction of the pin in the second direction 26. As the connector 10 returns to its first latched position in FIG. 1E from its second latched position in FIG. 1B, the major axis of the spring 16, i.e., the longer axis of the coils of the spring, is rotated compared to that of FIG. 1A. The second connector component 14 can now completely separate from the first connector component 12 by further moving in the second direction 26. As shown, the spring 16 is an axial canted coil spring. However, a radial canted coil spring is contemplated. In contrast, the tapered side wall 38 of the primary groove 20 generally loads the spring along its major axis in FIG. 1A and therefore does not permit retraction in the second direction 26.

Figure 1C:
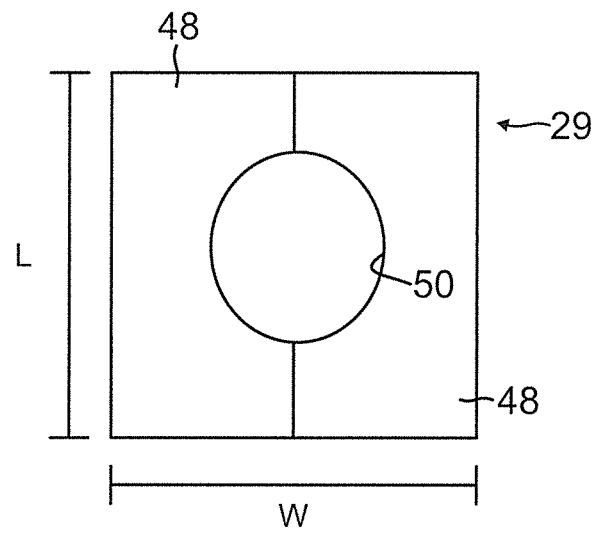
FIG. 1C is a plan view of the stop feature of FIG. 1A.

FIG. 1C shows a stop feature 29 for prohibiting movement of the second connector component 14 from moving to the second position unless removed or overcome. In one example, the stop feature 29 is formed by engaging two separately formed flange sections 48 over the pin 14, which may be attached to one another using fasteners, straps, detents, adhesive, or other similar retention means. The stop feature 29 has a central opening 50, a length L, a width W, and a depth D (FIG. 1A), which can vary in size depending on the desired applications. Although shown with a square configuration, the stop feature 29 may embody other shapes or configurations, such as round, star-shaped, oval, etc.

Figure 1D:
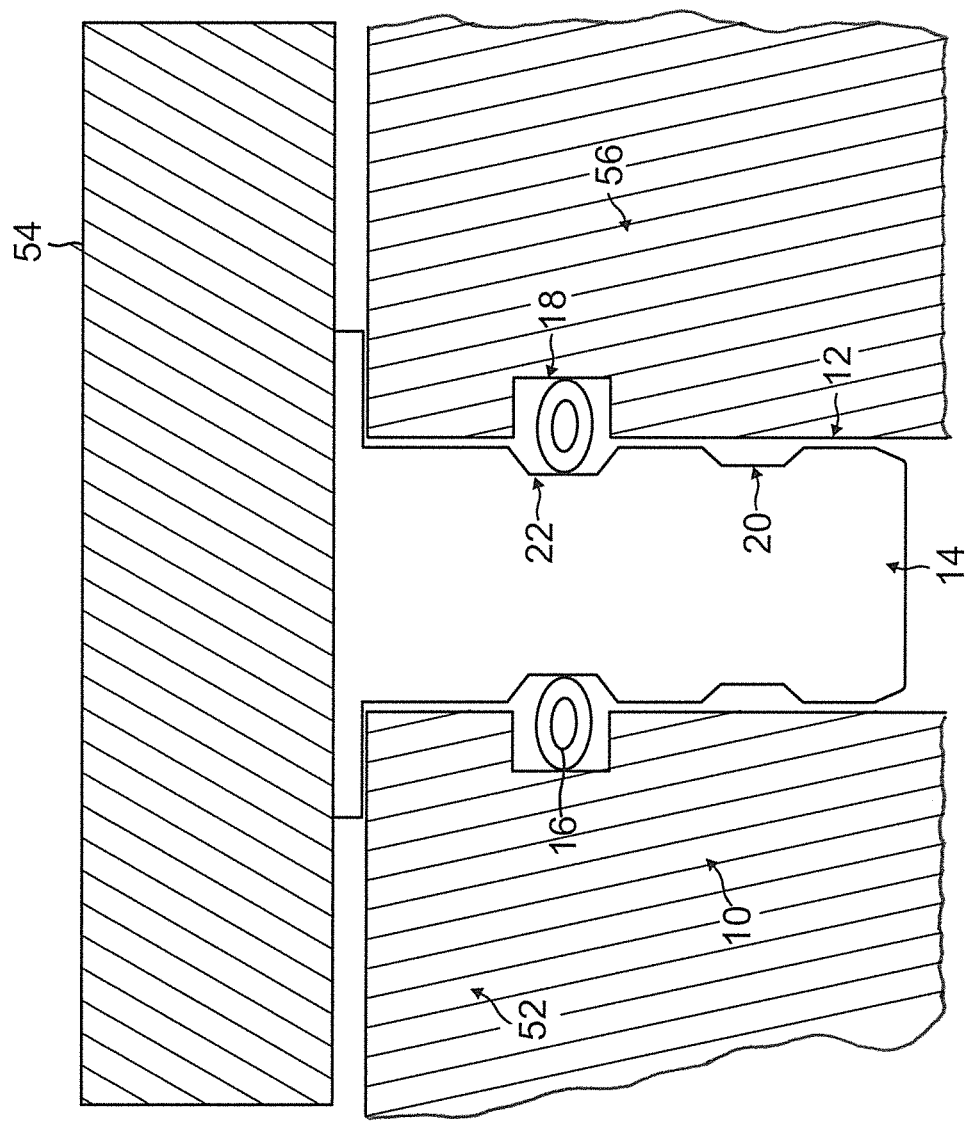
FIG. 1D is a schematic cross-section side view of the dual direction connector of FIGS. 1A and 1B attached to first and second articles of manufacture.
Figure 1E:
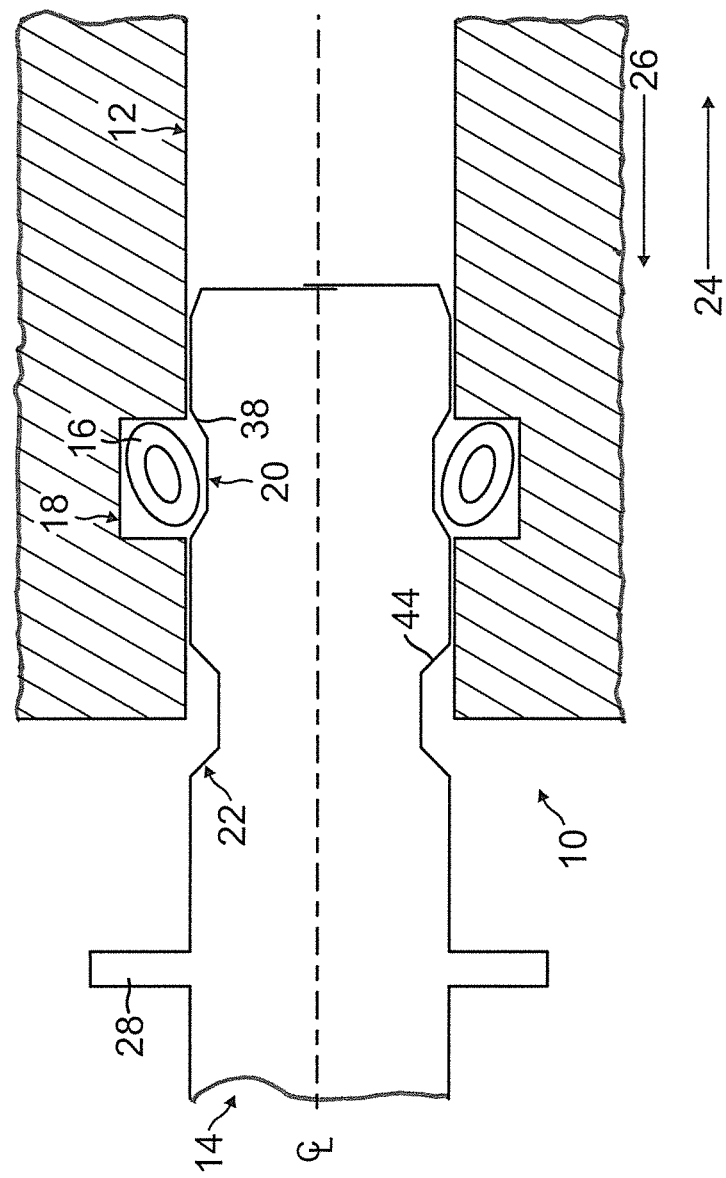
FIG. 1E is a schematic cross-sectional side view of the dual directional connector of FIG. 1A returning to the first latched position from the second latched position of FIG. 1B with the spring coil axis rotated to enable retraction.

FIG. 1D is a schematic side view of the connector 10 of FIGS. 1A and 1B incorporated in an article of manufacture 52, which includes a first article section 54 and a second article section 56. FIG. 1D shows the article of manufacture 52 having the stop feature 29 removed to enable separation of the first article section 54 from the second article section 52. It is understood that the article of manufacture 52 may be locked by having the stop feature 29 mounted therein and the spring 16 captured between the housing groove 18 and the primary groove 20, as shown in FIG. 1A. In practice, the article of manufacture 52 may embody any number of different objects across any number of different industries and applications. As non-limiting examples, the connector 10 may be incorporated in various aerospace, military & defense, oil & gas, automotive, power transmission & distribution, medical device, industrial, medical electronics, green tech, and consumer industries. For example in aerospace industry, the connector may be used, as non-limiting examples, as a replacement for a ball detent system on a fuel coupling connector, as a fastener for fastening access panels on aircraft to allow removal without tools, for holding injection seats on aircraft to allow removal for maintenance without tools, and for tethering a UAV (unmanned aerial vehicle) to a rail launch system, which allows for positive mechanical/electrical connection and release by allowing the spring to move to the second position. With reference to FIG. 1D, for example, a seat 54 may be incorporated with one or more second connector components 14 to be attached to a plane or foundation 56 having a corresponding number of first connector components 12, which comprise bores having a groove 18 for capturing a spring. In another example, the components are reversed so that the seat includes a plurality of first connector components 12 while the plane or deck includes a corresponding number of second connector components 14.

In another embodiment, the connector 10 of FIG. 1A is useable as a replacement for fasteners and bolts, which includes a nut/bolt combination or a screw/threaded bore combination. For example, the second connector component 14 may replace a bolt or a screw while the first connector component 12 may replace a nut or a threaded bore. The first article member 54 and the second article member 56 may embody any number of objects or devices that are typically used with a nut/bolt combination or a screw/threaded bore combination, for example a picture frame and a wall, a chair leg and a chair seat, a shelf and a case, etc.

For military and defense industry, the connector 10 may be used, as non-limiting examples, as an interconnect system for holding and quick replacement of modular Radar/LiDAR/Electro Optics/Infrared systems, as a fastener system for ground-based robotic vehicle, allowing quick replacement of different modules for varying applications, as a fastener for fastening access panels or armor plating on vehicles to allow removal without tools; and for tethering truck/vehicle mounted rockets/missiles providing positive mechanical/electrical connection, but also allowing for release at time of vehicle launch.

For oil and gas industry, the connector 10 may be used, as non-limiting examples, as a down-hole tool installation/retrieval system, for securing cables and wires for control systems, for opening and closing hatch doors, for securing shelves to hold supplies, and for anchoring machineries and devices to foundations and platforms.

For power transmission and distribution industry, the connector 10 may be used, as non-limiting examples, as a connector cable to replace the need for soldering, to secure control panels, to connect machineries and devices, to close cabinets and doors, and to secure objects together.

For medical device, medical electronics, automotive, industrial, and alternative energy industries, the connector 10 may be used, as non-limiting examples, as electrical connectors, as mechanical connectors, as fluid line connectors, and as electrical quick connectors.

Thus, an aspect of the present system and method is understood to include a connector comprising a first connector component having a first connector groove and a second connector component having a primary groove and a secondary groove, a stop feature abutting against either the first connector component, the second connector component or both to prevent movement of the first connector component along a first direction, and a canted coil spring captured between the first connector groove and the primary groove to lock the first connector component to the second connector component in a first position. The connector is further understood to include a mechanism for removing the stop feature from the first connector component, the second connector component or both to enable further movement of the first connector component along the first direction to a second position to capture the canted coil spring between the first connector groove and the secondary groove. The connector is further understood to permit rotation of a spring axis when in the second position. The connector is further understood to permit movement of the second connector component along a second direction, which is opposite the first direction, after being in the second position. The connector is further understood to include an extended feature abutting against the stop feature. In a specific example, the first connector component is a housing comprising a bore and having the first connector groove located therein. In another example, the first connector component is cylindrical member or pin having the first connector groove located on an outside surface. In yet another example, the stop feature comprises a flange comprising a bore made from two or more flange components. In still yet another example, the extended feature comprises a flange mounted onto a cylindrical member.

The connector 10 and the stop feature 29 may be made from a number of different materials, including from metal, plastic, and engineered plastic (such as PEEK and PEK) depending on the application. The connector 10 may be used purely as a mechanical device to hold different components together and/or as an electrical connector for transferring electrical signals or current between components that are connected to the first connector component 12 and the second connector component 14. The spring 16 may be made from a single metal wire or from a multi-layer wire. Exemplary multi-layer wires are disclosed in application Ser. No. 12/767,421, Pub No. 2010/0289198, filed Apr. 26, 2010.

Figure 2A:
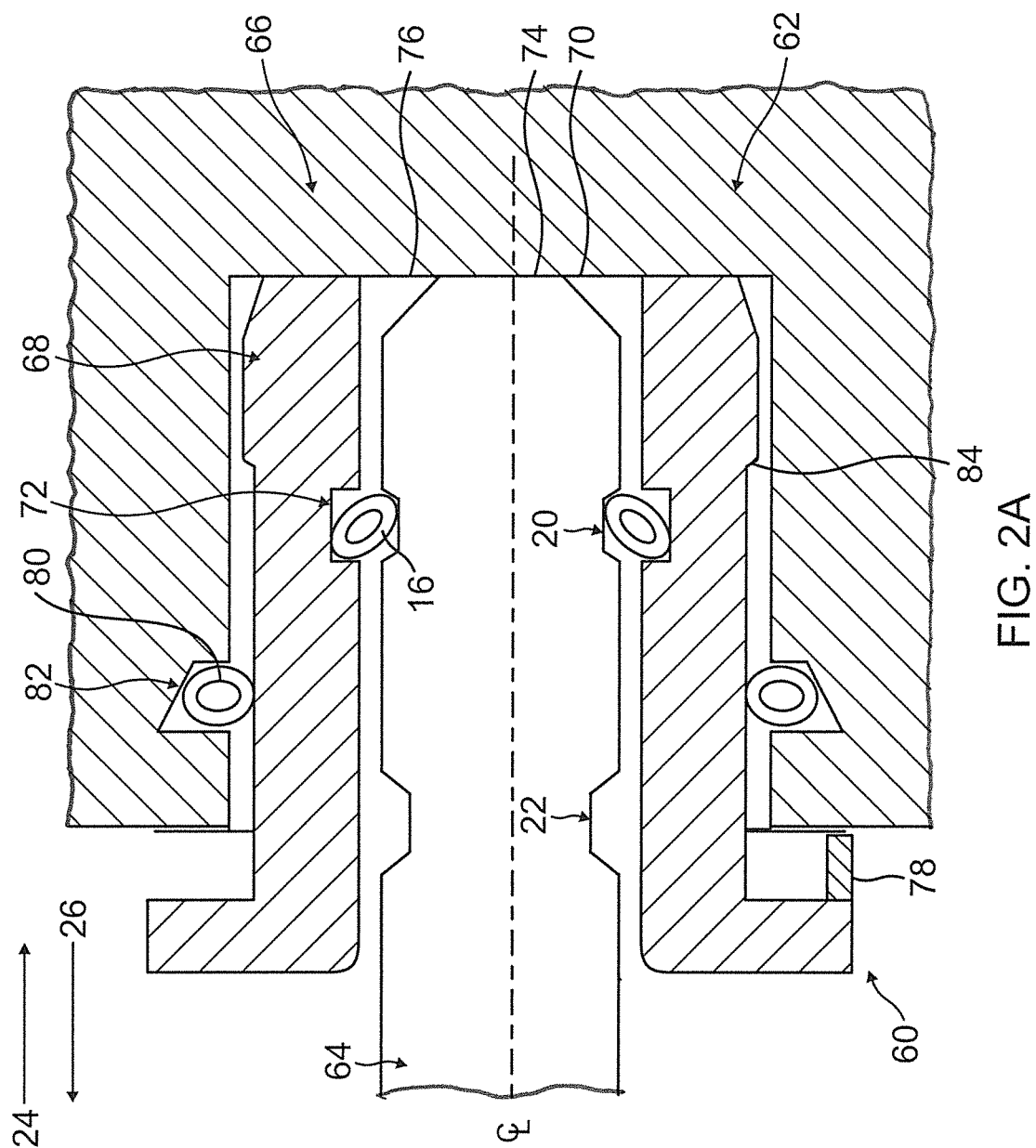
FIG. 2A shows a schematic cross-sectional side view of an alternative dual direction connector, which shows a second connector component moving into a bore of a first connector component and a stop feature in sliding engagement with both the first and the second connector components.

FIG. 2A is a schematic cross-sectional side view of an alternative connector provided in accordance with aspects of the present device, system, and method, which is generally designated 60. As shown, the connector 60 comprises a first connector component 62 locked relative to a second connector component 64, similar to the connector 10 of FIGS. 1A and 1B. However, in the present embodiment, a modified stop feature 66 is used, which comprises a combination sleeve 68 and dead stop 70. In the example shown, the second connector component 64 is locked to the sleeve 68 by capturing the spring 16 between the sleeve groove 72 and the primary groove 20 while abutting the end surface 74 of the pin against the housing end wall 76. The sleeve 68 is further removably fixed relative to the first connector component 62 by a fastener 78 or other similar means, such as break away rod or wire, strap, buckle, cotter pin, etc. In the configuration shown, the second connector component 64 is prevented from moving in the first direction 24 due to the end wall 76 and in the second direction 26 due to the spring 16 being captured by the sleeve groove 72 and the primary groove 20 and loaded generally along its major axis, i.e., the longer axis of the spring coils.

Figure 2B:
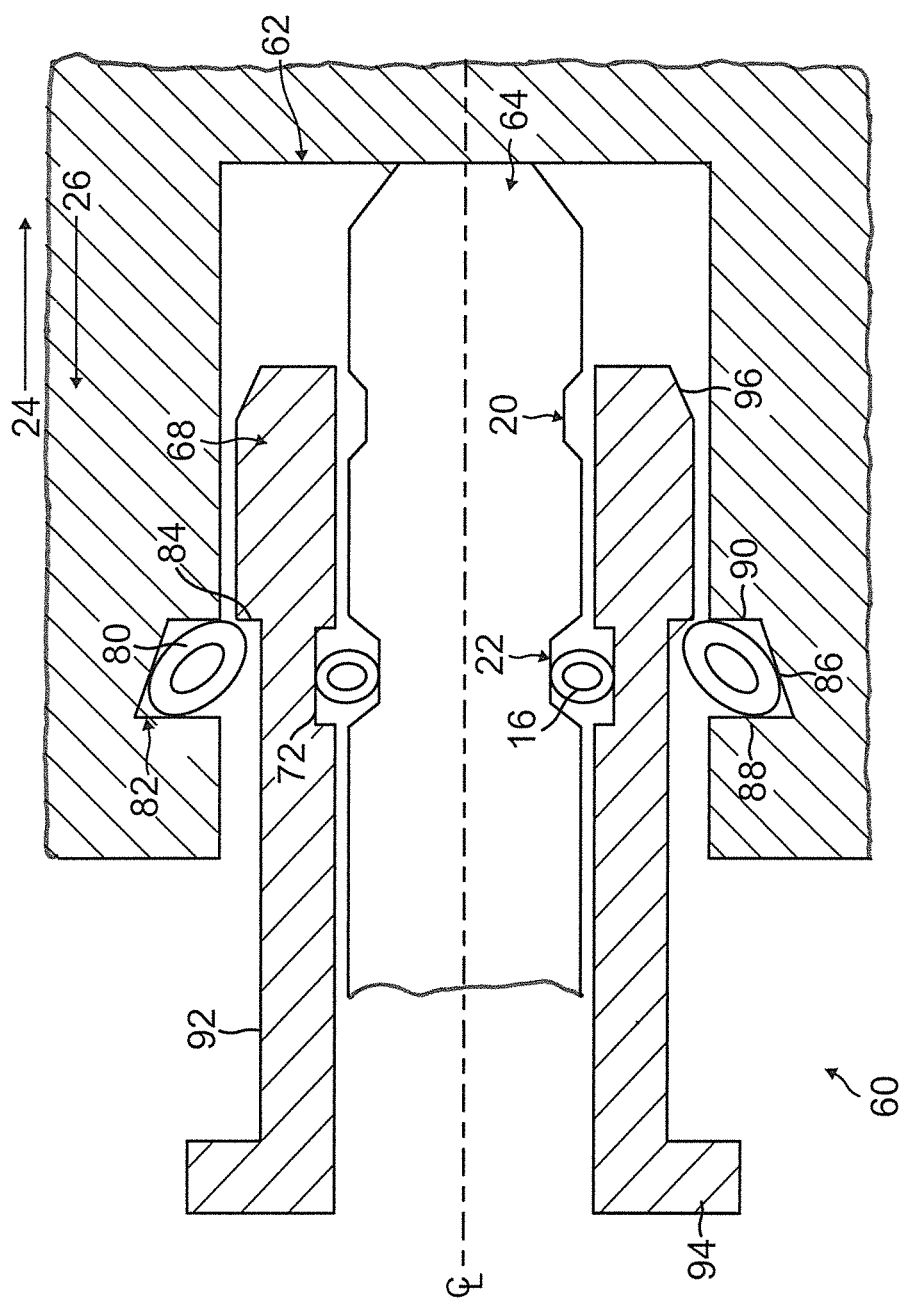
FIG. 2B shows a schematic cross-sectional side view of the dual direction connector of FIG. 2A with the stop feature retracted to movie the canted coil spring to a second latched position without moving the second connector component.

To unlock the second connector component 64 from the sleeve 68, the fastener 78 is first removed to enable relative movement between the sleeve 68 and the first connector component 62. The sleeve 68 is then moved in the second direction 26 until the outer spring 80 located in the groove 82 of the first connector component 62 loads against the shoulder 84, as shown in FIG. 2B. Concurrently, the inner spring 16 is moved with the sleeve 68 and captured by the secondary groove 22 and the groove 72 on the sleeve. As previously described, the spring 16 is allowed to rotate and relaxes when captured by the secondary groove 22 due to its larger size relative to the primary groove 20. At this time, the second connector component 64 is free to move in the second direction 26 to separate from the sleeve 68 and the first connector component 62. Note that the reference first and second connector components are intended to designate different parts only and that the components can be reversed. In other words, the second connector component may be referred to as the first connector component and may incorporate a single external groove while the housing incorporates two internal grooves with one being the primary groove and the other being the secondary groove. The terms first direction and second direction are also relative terms and depend on which component is being move and which is being held stationary.

In the embodiment shown, the groove 82 on the first connector component 62 has a tapered bottom wall 86 that is tapered relative to at least one of the side walls 88, 90. This tapered bottom wall 86 facilitates loading the outer spring 80 against the shoulder 84 on the sleeve generally along its major axis, which is the longer of its two axes. In another embodiment, the bottom wall 86 is flat or orthogonal to at least one of the side walls 88, 90. The sleeve is also shown with a race 92 formed between the shoulder 84 and a proximal flange 94, which may be used for grasping to retract the sleeve 68 and move the inner spring 16. At the distal end, the nose section may incorporate a taper 96 to facilitate assembling the sleeve 68 into the first connector component 62.

Similar to the connector 10 of FIGS. 1A and 1B, the present connector 60 may be practiced in a wide variety of applications. As non-limiting examples, the connector 60 may be incorporated in various aerospace, military & defense, oil & gas, automotive, power transmission & distribution, medical device, industrial, medical electronics, green tech, and consumer industries.

Thus, aspects of the present device, assembly and method include a connector 60 comprising a first connector component, a stop feature, and a second connector component and wherein both the stop feature and the second connector component are slidable relative to the first connector component and to one another. The present device, assembly, and method are also understood to include a locking mechanism to lock relative movement between the first connector component and the second connector component using a canted coil spring in a primary groove and to only permit relative movement by first sliding the sleeve away from the first connector component to relocate the spring in a secondary groove, which is larger than the primary groove. In a specific example, the secondary connector component 64 has a nose section that is prevented from moving further into the first connector component by an end wall inside a bore of the first connector component. The end wall prevents the second connector component from sliding along a first direction 24 to reposition the spring in the secondary groove.

Figure 3A:
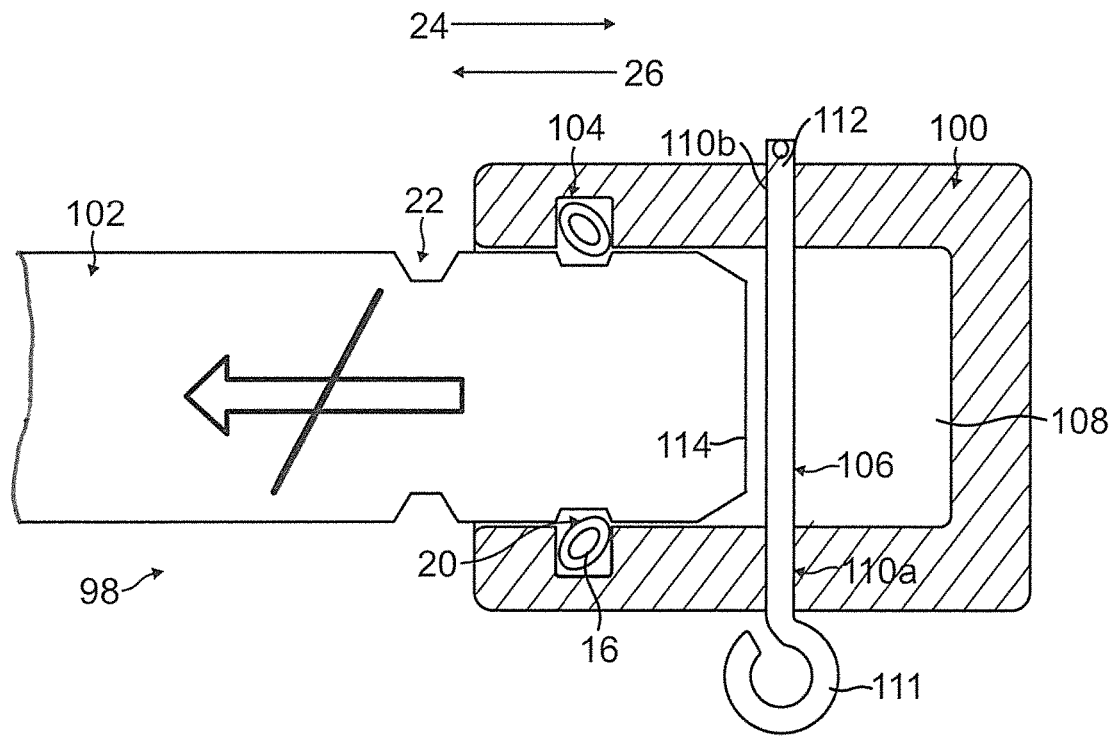
FIG. 3A shows a schematic cross-sectional side view of an alternative dual direction connector, which shows a second connector component moving into a bore of a first connector component and a stop feature preventing further advancement.

FIG. 3A is a schematic cross-sectional side view of an alternative connector provided in accordance with aspects of the present device, system, and method, which is generally designated 98. As shown, the connector 98 comprises a first connector component 100 and a second connector component 102, which are locked to one another by capturing a canted coil spring 16 between the first connector groove 104 and the primary groove 20. The connector groove 104 may comprise a flat bottom groove or two tapered surfaces that define a V-groove. As previously discussed, in the locked position, the spring 16 is loaded along its major axis. i.e., its longer axis, so that separation by moving the second connector component 102 along the second direction 26, or moving the first connector component along the first direction 24, will require compressing the spring along its major axis, which normally does not compress. However, unlocking is permitted if the spring 16 is able to rotate so that it can then compress along its minor axis, i.e., the shorter axis of the spring coils. Note that when a particular sliding direction is discussed for a connector component, it is assumed that the other connector component is held stationary. Obviously, the components can be moved simultaneously or a different component is held stationary.

The connector 98 further includes means for limiting relative movement between the first connector component 100 and the second connector component 102 to prevent the spring 16 from rotating. In the present embodiment, the means for limiting relative movement is a secure pin 106, which acts as a stop feature to prevent the second connector component 102 from sliding further into the bore 108 of the first connector component. As shown, the secure pin 106 is inserted into a pair of bosses 110 on the first connector component 100 and removably held thereto to act as a barrier for the second connector component 102. In an example, the secure pin 106 is engaged to the bosses 110 using tapered fitting. In another example, the secure pin 106 is held using a cap or a bolt (not shown) to secure against the pin end 112. A holding or gripping part 111 is provided to facilitate removal and/or assembly, which in the present embodiment is shown as an eye-hook with other shapes and configurations contemplated. In still another example, the pin end 112 is threadedly engaged to the boss 110b. Although the end 114 of the second connector component 102 is shown spaced from the secure pin 106, a smaller gap than shown or no gap may be practiced to restrict relative movement between the two connector components until the secure pin 106 is moved out of the way of the end 114 of the second connector component 102, such as when removing the pin 106 from the bosses 110a, 110b.

Figure 3B:
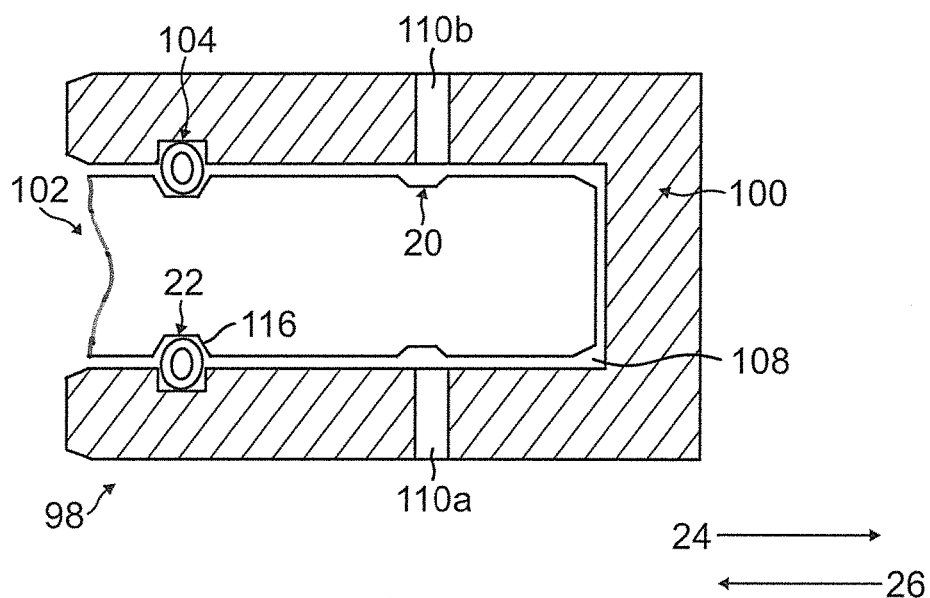
FIG. 3B shows a schematic cross-sectional side view of the dual direction connector of FIG. 3A with the stop feature removed to enable moving the second connector component further into the bore of the first connector component so that the spring is latched in a second latched position. Instead of removing the stop feature, it may be left in place and sheared by the second connector component.

FIG. 3B is a schematic cross-sectional side view of the connector 98 of FIG. 3A, shown with the secure pin 106 completely removed from the first connector component 100 and the second connector component 102 advanced further into the bore 108 of the first connector component to move the spring into a second position from the first position (FIG. 3A). In the second position, the spring 16 is captured by the first connector groove 104 and the secondary groove 22 of the second connector component 102. As shown, the spring 16 is allowed to rotate so that its major axis is generally vertical, i.e., generally perpendicular, to the centerline of the second connector component 102. This rotation is made possible at least in part by providing a larger secondary groove 22 than the primary groove 20, which is understood to mean wider, deeper, or both wider and deeper. The larger secondary groove 22 allows the spring 16 rotate to its more relaxed position. From this second spring position (FIG. 3B), the second connector 102 can move in the second direction 26 relative to the first connector component 100 to separate therefrom.

In another embodiment, the secure pin 106 is a shear pin, which is configured to snap, shear, or break when the second connector component 102 is advanced against the pin 106 and overcome the shear strength of the pin. The shear strength value of the pin can be selected for a desired application by selecting the material type and/or size, such as a desired pin diameter, to shear at a certain value.

Like the embodiment of FIG. 1D, the present connector 98 may be attached to a first article of manufacture and/or a second article of manufacture to enable removable connection between the two articles of manufacture.

Thus, aspects of the present device, system, and method include a first connector component and a second connector component. The first connector component comprising a groove or a combination primary groove spaced from a secondary groove and the second connector component comprising the other one of the groove or the combination primary groove spaced from a secondary groove. The connector further comprising a first spring position defined by the groove and the primary groove capturing a canted coil spring and loading the canted coil spring along a first spring angle to permit moving the second connector component in a first direction but not in a second opposite direction relative to the first connector component. The loading is generally along the spring's major axis, which is the longer of its two axes—the other is the minor axis. In one example, the first direction is restricted by a removable stop feature. In a specific example, the stop feature is a secure pin removably secured to the first connector component. The secure pin presents an obstruction for the second connector component to restrict movement of the second connector component along the first direction and wherein the second connector component is movable in the first direction when the secure pin is removed. At this time, the first connector component and the second connector component may move relative to one another to move the spring to a second spring position, which is a position in which the groove and the secondary groove captures the spring but allows the spring to rotate to a different spring angle than when in the first position. At the second spring position, the spring is able to rotate when the second connector component 102 is moved in the second direction 26 relative to the first connector component 100. In particular, the tapered side wall 116 of the second groove 22 contacts and rotates the spring 16 during movement of the second connector component 102 in the second direction to separate from the first connector component. In another embodiment, the secure pin is removed by shearing the pin.

Figure 4A:
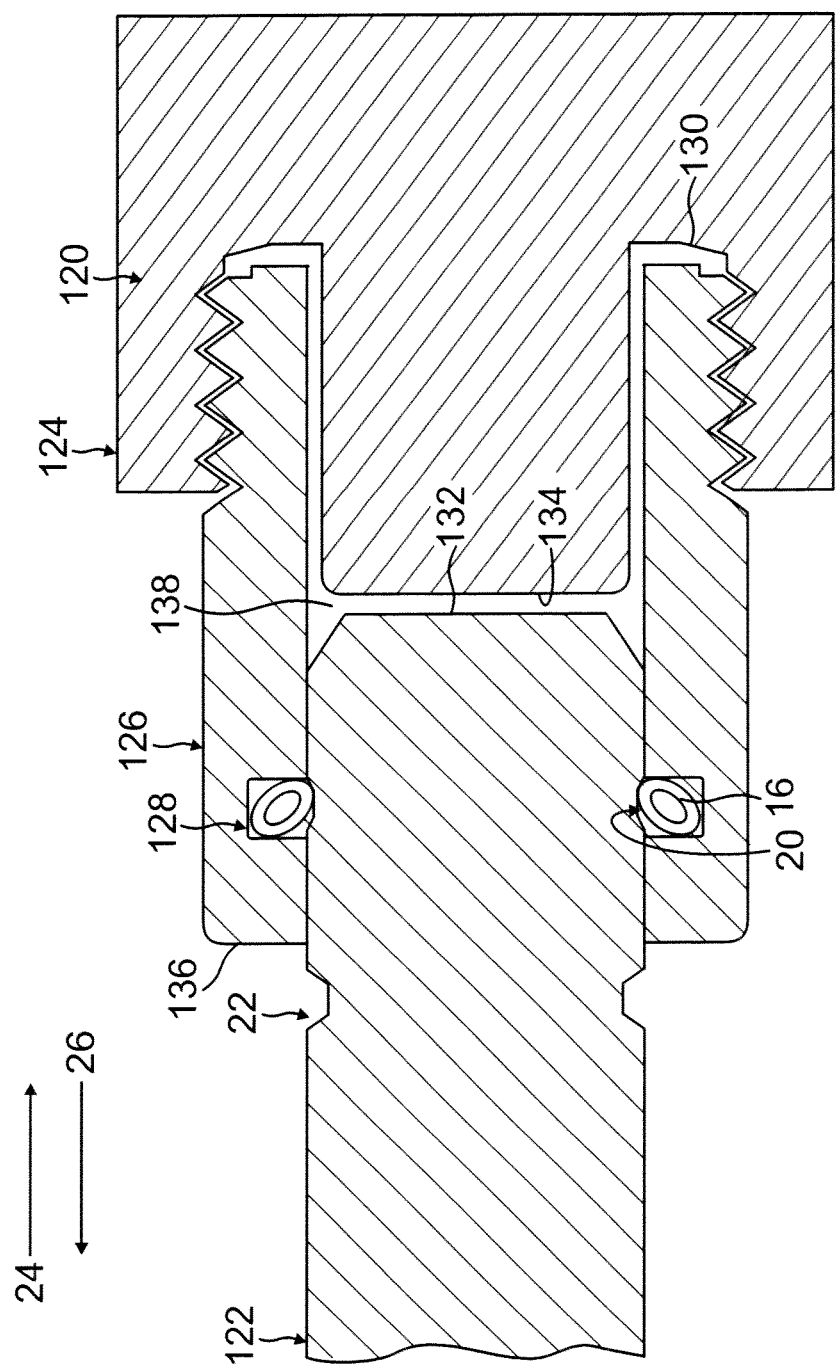
FIG. 4A shows a schematic cross-sectional side view of an alternative dual direction connector, which shows a second connector component moving into a bore of a first connector component and a stop feature preventing further advancement.

FIG. 4A is a cross-sectional side view of yet another connector assembly provided in accordance with aspects of the present device, system, and method, which is generally designated 118. Like the other connector assemblies and devices discussed elsewhere herein, the present connector assembly has two latched positions and wherein a stop feature is provided to control movement between the first latched position and the second latched position. The connector assembly comprises a first connector component 120 and a second connector component 122, which has a primary groove 20 and a secondary groove 22, similar to the second connector assemblies discussed with reference to FIGS. 1A, 2A and 3A. In the present connector 118, the first connector component 120 is made from at least two separately formed and subsequently connected connector pieces 124, 26 with one of the pieces having a first connector groove 128. In one specific embodiment, the first connector piece 124 has an annular space 130 for receiving the second connector piece 126. The first and the second connector pieces 124, 126 can be telescopically engaged to one another so that when telescopically actuated, a clearance space is provided between then end surface 132 of the second connector piece 122 and the nose section 134 of the first connector piece 120, as further discussed below.

The connector 118 of FIG. 4A has a first latched position and a second latched position. In the first latched position shown in FIG. 4A, the second connector piece 122 is moved in the first direction 24 until the spring 16 is captured between the first connector groove 128 and the primary groove 20, similar to other connectors discussed elsewhere herein. In the first latched position, the spring's major axis is loaded so that it is not possible to move the second connector piece 122 in the second direction 26 without destroying the spring. The second connector piece 122 is prevented from moving further in the first direction 24 by sizing the end surface 132 of the second connector piece 122 and the nose section 134 of the first connector piece 120 with little or no space so that movement is prohibited due to the physical presence of the nose section 134.

In one example, the first connector piece 120 is threadedly engaged to the second connector piece 126 and a first bore depth is defined by a distance between the nose section 134 and an end surface 136 of the second connector piece 128 measured along a centerline of the connector. The first bore depth is configured to stop advancement of the second connector component 122 in the first direction 24 when latched in the first position. A gap 138 located between the two end surfaces 132, 134 may be controlled as desired. For example, when the gap 138 is zero or nominal, there is little movement or lag between the first and the second connector components 120, 122.

Figure 4B:
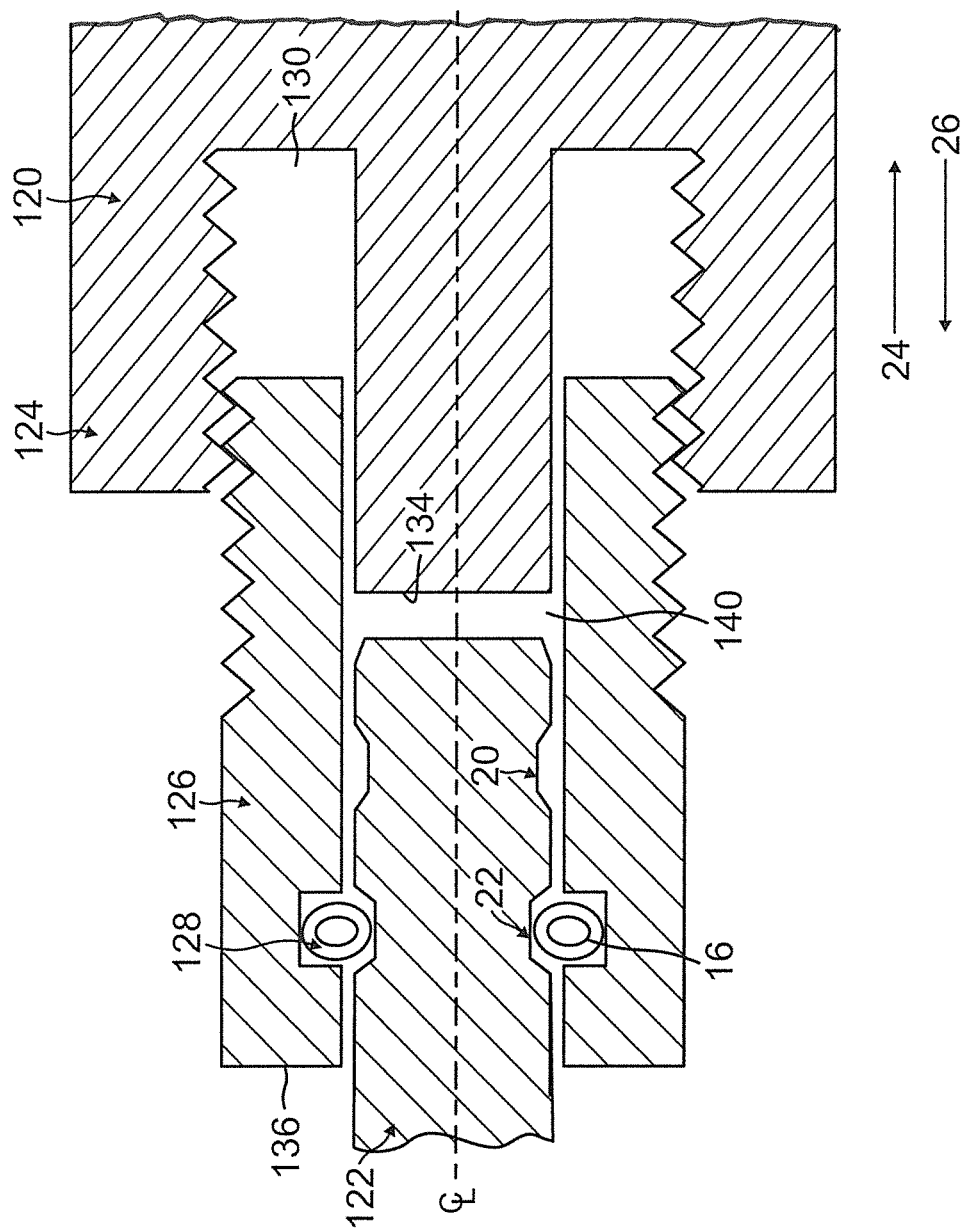
FIG. 4B shows a schematic cross-sectional side view of the dual direction connector of FIG. 4A with the stop feature enlarging the bore of the first connector component to enable moving the second connector component further into the enlarged bore of the first connector component to a second latched position.

With reference now to FIG. 4B, the first connector component 120 is shown with the second connector piece 126 partially unthreaded from the first connector piece 124. In this position, a second bore depth is defined by a distance between the nose section 134 and an end surface 136 of the second connector piece 128 measured along a centerline of the connector. The second bore depth is greater than the first bore depth and configured to permit further insertion of the second connector component 122 further into the bore 140 of the first connector piece 120. Thus, aspects of the present connector include first connector component having a bore depth that is variable by telescopically moving different connector pieces relative to one another to permit a larger or deeper bore to enable insertion of a second connector piece. The connector is further understood to include threaded engagement between the different connector pieces to control the depth of the bore. More broadly speaking, the present connector is understood to include dual directional latch mechanisms with locking and threaded connector pieces to control relative movement between a first connector component and a second connector component.

As shown in FIG. 4B, the second connector component 122 is moved to a second latched position, which is defined by the first connector groove 128 and the secondary groove 22 simultaneously capturing the canted coil spring 22. In the second latched position, the spring is able to rotate and not loaded along its major axis. The second connector component 122 can now be retracted by moving in the second direction 26 and separate from the first connector component 120.

In practice, the connector 118 may be used with first and second articles of manufacture to secure the two articles together, similar to other connectors discussed elsewhere herein. Furthermore, movement of the various connector components or connector pieces may be done automatically, such as using a servo motor with gears or a linkage system, using electromagnetic force, fluidic force, and pneumatic pressure.

Figure 5C:
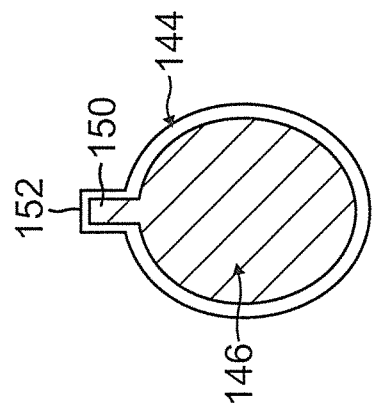
FIG. 5C is an end-view taken along line 5C-5C of FIG. 5A, which shows a key aligned with a key way.
Figure 5A:
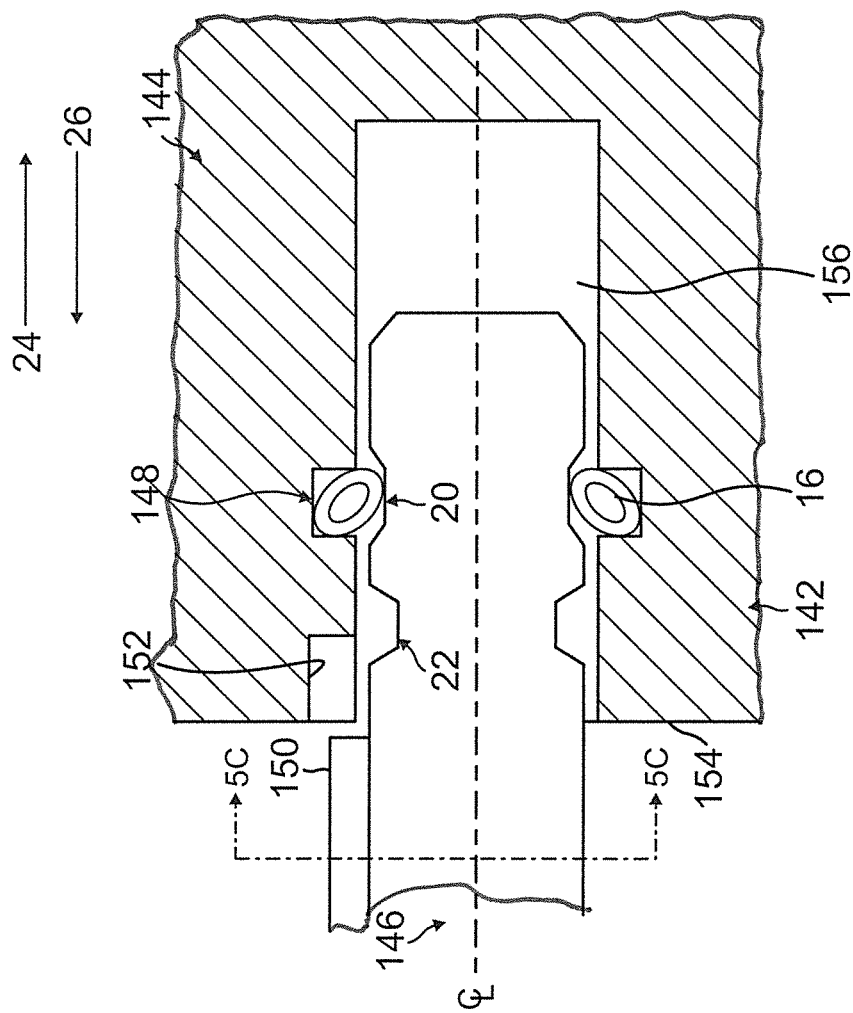
FIG. 5A shows a schematic cross-sectional side view of an alternative dual direction connector, which shows a second connector component moving into a bore of a first connector component and a stop feature preventing further advancement.

FIG. 5A is a cross-sectional side view of yet another connector assembly provided in accordance with aspects of the present device, system, and method, which is generally designated 142. Like the other connector assemblies and devices discussed elsewhere herein, the present connector assembly has two latched positions and wherein a stop feature is provided to control movement between the first latched position and the second latched position. As shown, the connector 142 comprises a first connector component 144 and a second connector component 146, which is engaged to one another in the first latched positioned by moving the second connector component 146 in the first direction 24. In the first latched position, the spring is loaded along its major axis by the first connector groove 148 and the primary groove 20, which prevents the second connector component 146 from retracting in the second direction 26.

With reference to FIG. 5C in addition to FIG. 5A, a key 150 is incorporated with the second connector component 146 and a key way 152 is incorporated with the first connector component 144. In another example, the key location and the key way location are reversed. When the key 150 is not aligned with the key way 152, the key 150 abuts the end surface 154 of the first connector component 144 and further advancement of the second connector component 146 into the bore 156 of the first connector component is not possible. Thus, the key 150 and key way 152 define a stop feature for preventing the connector from moving to the second latched position. However, when the key is aligned with the key way, relative movement is possible and the second connector component 146 can move further into the bore 156 to move the connector to the second latched position.

Figure 5B:
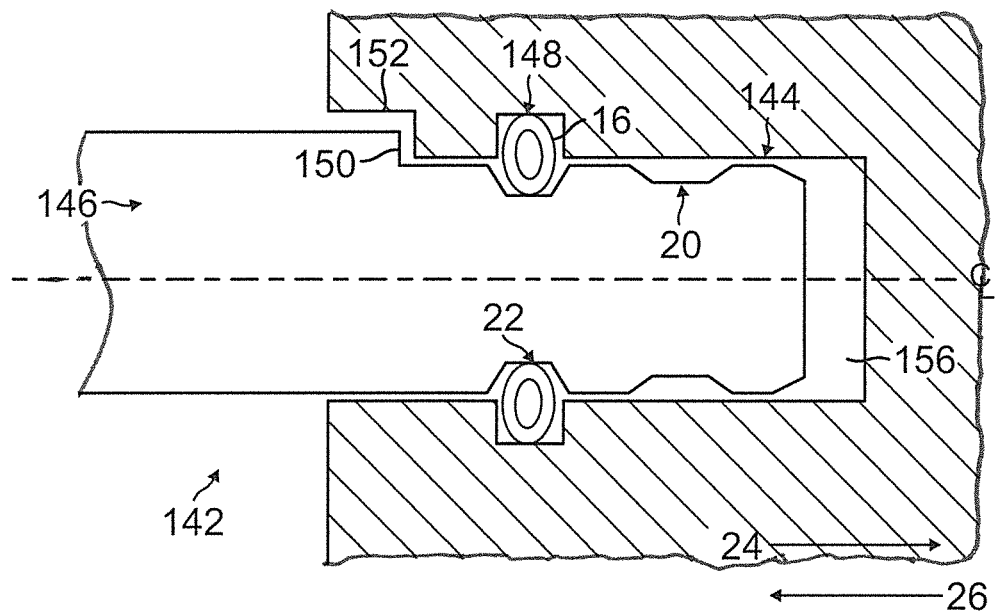
FIG. 5B shows a schematic cross-sectional side view of the dual direction connector of FIG. 5A with the stop feature aligned to enable moving the second connector component further into the bore of the first connector component so that the spring is latched in a second latched position.

FIG. 5B is a cross-sectional side view of the connector of FIG. 5A in the second latched position. As shown, the key 150 enters the key way 152 and is inserted further into the bore 156, which causes the spring to unlatch from the primary groove 20 and then latched with the secondary groove 22 in the second latched position. In the second latched position, the spring is allowed to rotate due to the relatively larger secondary groove 22. The second connector component 146 can now be removed from the first connector component 144 by moving in the second direction 26. In practice, the connector 142 may be used with first and second articles of manufacture to secure the two articles together, similar to other connectors discussed elsewhere herein.

Thus, the present connector may be understood to include a first connector and a second connector having a first latched position and a second latched position and wherein the connector is prevented from moving from the first latched position to the second latched position by a key and a key way. The connector is further understood to permit unlatching only after the key is inserted into the key way and the spring rotated to its more relaxed state. Although only one key and one key way is shown, more than one of each may be incorporated. Thus, broadly speaking, the connector comprises multi-latch points with at least one key and one key way to control movement between the multi-latch points.

FIG. 6A is a cross-sectional side view of yet another connector assembly provided in accordance with aspects of the present device, system, and method, which is generally designated 158. Like the other connector assemblies and devices discussed elsewhere herein, the present connector assembly has two latched positions and wherein a stop feature is provided to control movement between the first latched position and the second latched position. As shown, the connector 158 comprises a first connector component 160 and a second connector component 162, which engage one another in the first latched positioned by moving the second connector component in the first direction 24. The spring 16 is loaded general along its major axis in the first connector groove 164 and the primary groove 20. As loaded, the second connector component 162 cannot separate from the first connector component by moving in the second direction 26.

To enable separation of the first connector component 160 from the second connector component 162, the spring must first rotate to enable compression along its minor axis. In one example, this is facilitated by providing a shaped shaft section 168 with at least two distinct shaft shapes or configurations. With reference to FIG. 6C, which is taken along line 6C-6C of FIG. 6A, the shaped shaft section 168 of the second connector component 162 incorporates a first shaft half-circle 170 and a second shaft half-circle 172, which has a larger diameter than the first half-circle 170. Similar to the connector embodiment of FIGS. 5A-5C, the present connector assembly is configured to be aligned before the connector can be moved to the second latched position. In one embodiment, the first connector assembly 160 is configured with a corresponding bore entrance 174 for receiving the shaped shaft section 168. In the embodiment shown, the bore entrance 174 has a first opening 176 sized to receive the first half-circle 170 but not the second half-circle 172. Thus, when the shaped shaft section 168 is appropriately aligned with the bore entrance 174, the second connector component 162 can advance further into the bore 166. If not appropriately aligned, the shaped shaft section 168 functions as a stop feature to prevent further advancement of the second connector component into the bore 166 of the first connector component.

Figure 6B:
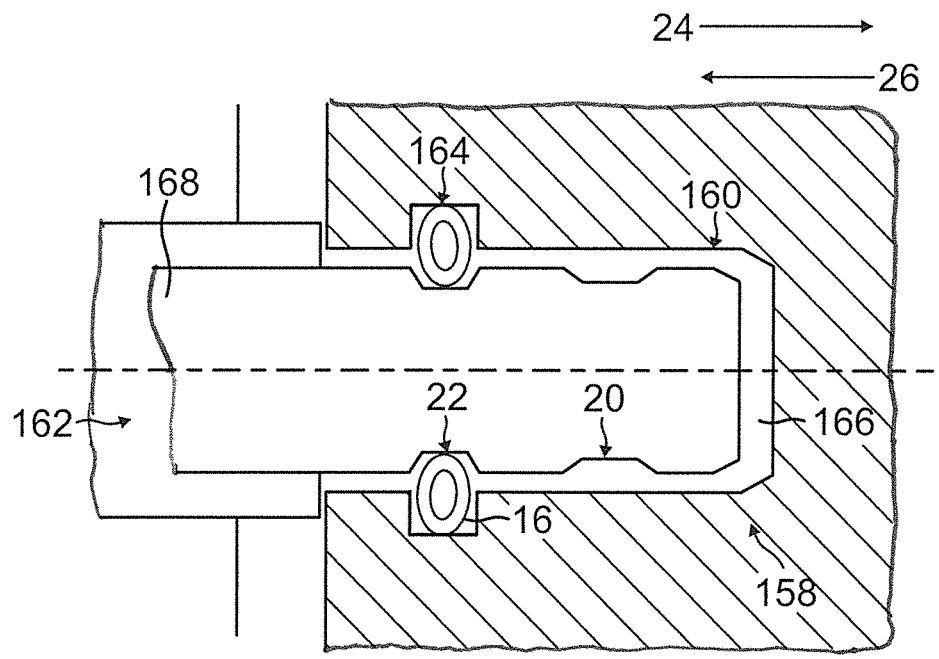
FIG. 6B shows a schematic cross-sectional side view of the dual direction connector of FIG. 6A with the stop feature aligned to enable moving the second connector component further into the bore of the first connector component so that the spring is latched in a second latched position.

FIG. 6B shows the connector 158 of FIG. 6A advanced to the second latched position with the spring 16 now latched between the first connector groove 164 and the secondary groove 22. As shown, the shaped shaft section 168 is aligned and enters the bore entrance 174 to permit advancement of the second connector component 162 further into the bore 166 of the first connector component 160. The second connector component 162 can now retract away from the first connector component 160 by moving in the second direction 26 after the spring has been allowed to rotate and relax in the relatively larger secondary groove. Thus, broadly speaking, the connector comprises multi-latch points with at least one shaped shaft section and one shaped bore entrance to control movement between the multi-latch points.

FIG. 7A is a cross-sectional side view of yet another connector assembly provided in accordance with aspects of the present device, system, and method, which is generally designated 178. Like the other connector assemblies and devices discussed elsewhere herein, the present connector assembly has two latched positions and wherein a stop feature is provided to control movement between the first latched position and the second latched position. As shown, the connector 178 comprises a first connector component 180 and a second connector component 182, which engage one another in the first latched positioned by moving the second connector component in the first direction 24. Movement of the second connector component 182 in the first direction 24 into the bore causes the spring 16 to latch between the first connector groove 184 and the primary groove 20, which loads the spring along its major axis so that movement of the second connector component in the second direction 26 is not possible without destroying the spring 16 but further movement in the first direction 24 is still possible but for a stop feature.

Due to the groove geometries of the first connector groove 184 and the primary groove 20, movement in the first direction 24 forces sidewall 190 to abut the spring and compresses the minor axis, i.e., the smaller axis, of the spring 16 to provide clearance for further insertion. Conversely, movement in the second direction 26 causes sidewall 192 to abut the spring along the major axis, i.e., the longer axis, which does not significantly deflect or compress and therefore will not provide clearance for movement in the second direction. This physical phenomenon is understood to apply to the connectors described elsewhere herein.

FIG. 7B shows the inside bore of the first connector component 180 without the second connector component 182. In the present embodiment, a stop feature 188 is incorporated, which embodies portions of helical threads 194 and at least one key 196 (FIG. 7A). As shown, four channels 198 are incorporated at the entrance 200 of the first connector component 180, which lead to four helical thread portions 194 formed on the inner wall surface 202 of the first connector component 180. At least one key 196 is incorporated on the second connector component 182 with more than one key contemplated. Unless the key 196 is aligned with one of the channels 198, it will abut the end surface 202 of the first connector component 180 when attempting to advance the first connector component 182 further into the bore.

In operation, a user must first align the key 196 with one of the channels 198 by rotating the first connector component relative to the second connector component. To move the connector to a second latched position, the user turns the second connector component 182 while advancing it further into the bore until the spring 16 is moved to the second latched position. In this position, the spring 16 is latched between the first connector groove 184 and the secondary groove 22 but is allowed to rotate and relax, as previously discussed. The second connector component 182 can now retract away from the first connector component 180 by rotating and withdrawing from the bore 186. Thus, an aspect of the present connector is understood to include first and second connectors that have a first latched position and a second latched position using a canted coil spring and wherein movement between the two positions includes rotating and advancing the second connector component relative to the first connector component. The connector is also understood to permit complete separation of the second connector component from the first connector component by first rotating the major axis of the canted coil spring by rotating and translating the first connector component relative to the second connector component. Thus, broadly speaking, the connector comprises multi-latch points with at least one key and one key way to control movement between the multi-latch points and wherein translational and rotational movements are required to move the connector to the second position.

In practice, the connector 178 may be used with first and second articles of manufacture to secure the two articles together, similar to other connectors discussed elsewhere herein.

Figure 8A:
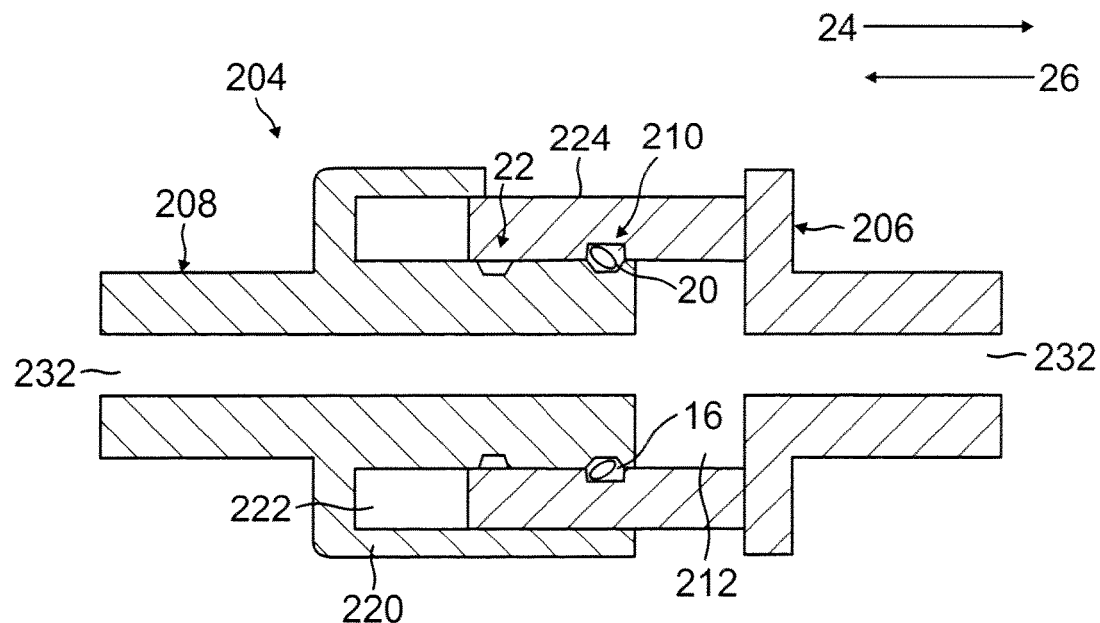
FIG. 8A shows a schematic cross-sectional side view of an alternative dual direction connector, which shows a second connector component moving into a bore of a first connector component and a stop feature preventing further advancement.

FIG. 8A is across-sectional side view of yet another connector assembly provided in accordance with aspects of the present device, system, and method, which is generally designated 204. Like the other connector assemblies and devices discussed elsewhere herein, the present connector assembly has two latched positions and wherein a stop feature is provided to control movement between the first latched position and the second latched position. As shown, the connector 204 comprises a first connector component 206 and a second connector component 208, which engage one another in the first latched positioned by moving the second connector component in the first direction 24. Movement of the second connector component 208 in the first direction 24 into the bore 212 causes the spring 16 to latch between the first connector groove 210 and the primary groove 20, which loads the spring along its major axis so that movement of the second connector component in the second direction 26 is not possible without destroying the spring 16 but further movement in the first direction 24 is still possible but for a stop feature.

Figure 8B:
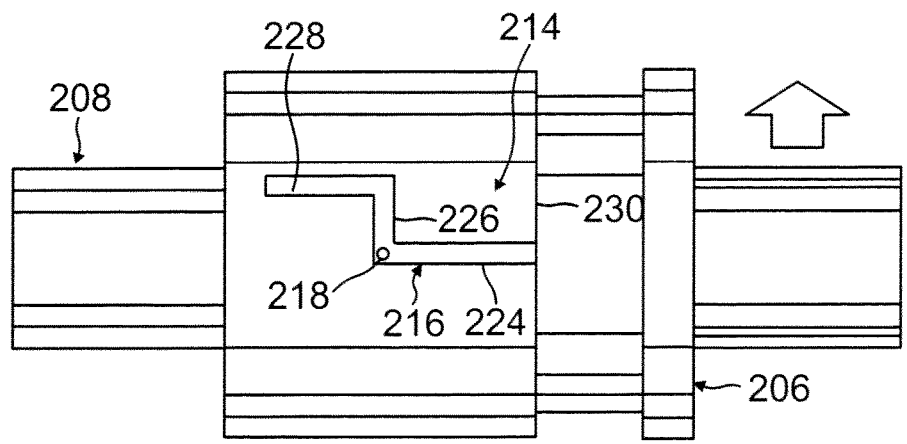
FIG. 8B shows a schematic cross-sectional side view of the dual direction connector of FIG. 8A with the stop feature aligned to enable moving the second connector component into the bore of the first connector component.

In the present embodiment, a stop feature 214 is incorporated, which embodies a complex notch or key way 216 and a key 218. With reference to FIG. 8B in addition to FIG. 8A, a collar 220 is incorporated on the second connector component 208 and defines an annular space 222 therebetween. The complex key way 216 is formed on or in the collar 220 and comprises a first key way section 224, a second key way section 226, and a third key way section 228. In one example, the first and the third key way sections are parallel and offset from one another with the first key way section 224 originates from an end edge 230 of the collar. In another embodiment, the first and the third key way sections are angled from one another. In a preferred embodiment, the second key way section 226 is perpendicular to the first and the third key way sections.

To place the connector 204 in the first latched position (FIG. 8A), the key 218 on the first connector component 206 is aligned with the first key way section 224 and then the first and the second connector components 206, 208 slid toward one another until the key 218 hits or abuts the second key way section 226. The connection results in the second connector component 206 sliding into the annular space 222 of the second connector component 208. At this point, the spring 16 is latched by the first connector groove 210 and the primary groove 20 and is loaded along its major axis so that retraction of the second connector component 208 in the second direction 26 is not possible without destroying the spring, as previously discussed. In an alternative embodiment, the key way 216 is positioned closer to the end edge 230 of the collar 220 and the first key way section 224 eliminated so that engagement between the key and the key way is not required for the first latched position.

To move the connector to the second latched position (not shown), the key 218 is moved along the second key way section 226 to align with the third key way section 228 by rotating the first connector component 206 relative to the second connector component 208. At this point, the key 218 can move into the third key way section 228, which corresponds to moving the second connector component 228 further into the bore 212 of the first connector component 206 to move the connector 204 to the second latched position, which is a position wherein the spring 16 is captured by the first connector groove 210 on the first connector component and the secondary groove 22 on the second connector component. At this point, the spring 16 is allowed to rotate due to the larger secondary groove 22, which is relatively larger than the primary groove 20. After moving to the second latched position, the connector 204 can now separate by moving the first connector component and the second connector component away from one another while un-doing the key and key way engagement, i.e., both translating and rotating the first and the second connector components relative to one another.

In practice, the connector 204 may be used with first and second articles of manufacture to secure the two articles together, similar to other connectors discussed elsewhere herein. Additionally, the connector 204 may incorporate a lumen or bore 232 for fluid or gas transfer through the connector. When used as part of a fluid connection system, fluid tight seals may be incorporated, such as using O-rings. Alternatively, the bore 232 may be used as a conduit for running cables or wires therethrough.

Figure 9:
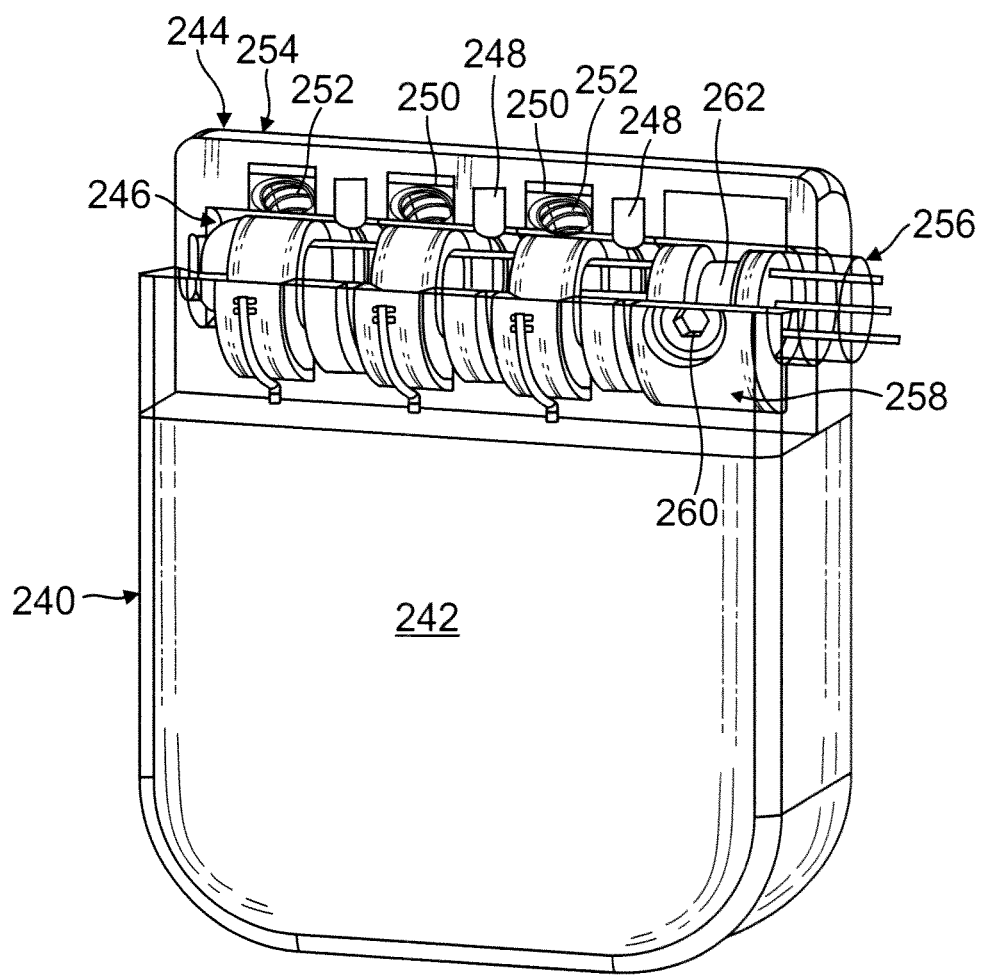
FIG. 9 is a partial cut-away perspective view of an implantable medical device (IMD) comprising a sealed housing and an in-line connector located in a header.

FIG. 9 is a perspective view of an implantable medical device (IMD) 240 provided in accordance with aspects of the present device, system, and method, which can include implantable cardio defibrillators, pacemakers, and programmable neurostimulator pulse generators. The IMD 240 comprises a sealed housing 242, which is known in the industry as a can or canned housing, and a header 244 comprising an in-line connector 246. The in-line connector 246 comprises a plurality of alternating seal elements 248 and conductive elements 250, of which only three alternating sets are shown with different numbers contemplated. Canted coil springs 252 are also incorporated, one in contact with each of the conductive elements 250. The header housing 254, the springs 252, the conductive elements 250, and the seal elements 248 have a common bore for receiving a lead cable 256. The lead cable 256 has terminal ends (not shown) that are positioned near an area of the body to be treated, such as near the heart for a cardiac heart pacemaker application. The cable 256 is configured to carry signals away from the canned housing 242 or vice versa for a therapeutic monitoring application. Additional information regarding IMDs and in-line connectors are disclosed in US Publication numbers 2008/0246231 and 2008/0255631, which are expressly incorporated herein by reference. Other IMDs and in-line connectors are also disclosed in co-pending application Ser. No. 12/717,732, filed Mar. 4, 2010, and Ser. No. 12/618,493, filed Nov. 13, 2009, the contents of each of which are expressly incorporated herein by reference.

To secure the lead cable 256 within the bore of the header, a retention block 258 is used, which comprises a set screw 260 for fastening against a corresponding surface 262 on the lead cable. The retention block 258 may be located at the inlet of the header 244, as shown, or at the far end of the header. In accordance with an aspect of the present device, system, and method, any of the connectors of FIGS. 1A-8B may be used in place of the combination retention block 258 and groove 262 on the lead cable 256 of the header of the IMD 240. For example, any of the first connector components of FIGS. 1A, 2A, 3A, 4A, 5A, 6A, 7A, and 8A may be used in place of the retention block 258 of FIG. 9 and instead of a single pin groove 262, a primary groove and a secondary groove are used with the lead cable 256 to permit a first latched position and a second latched position. Furthermore, the connector may be placed near the inlet as shown in FIG. 9 or at the far end of the header 244. Still furthermore, the modified retention mechanism using one of the connectors described in FIGS. 1A-8B may incorporate a single pin groove on the lead cable 256 and two housing grooves for the retention block 258. Still furthermore, the connectors of FIGS. 1A-8B may be used with any of the headers described in the '231 publication, the '631 publication, and the '732 application.

FIG. 10 is a schematic process flow diagram depicting a method of use of a connector assembly provided in accordance with aspects of the present method, which is generally designated 270. The method comprises the steps of providing a first connector component and a second connector component, such as a housing and a pin, at step 272. Either the first connector component can comprise a groove or spaced apart primary and secondary grooves or the second connector component can comprise the other one of the single groove or spaced apart primary and secondary grooves. The process further includes inserting the second connector component in a first direction until a canted coil spring is latched between the groove and the primary groove in a first latched position at step 274. At step 276, a stop feature is removed, aligned, circumvented. etc. to permit further insertion of the first connector and second connector components toward one another. The stop feature can be any of the various features discussed elsewhere herein.

The process further includes moving the connector assembly to a second latched position where the spring is latched between the groove and the secondary groove at step 278. The process further includes moving the second connector component in a second direction at step 280 to move the spring back to its first latched position but with a different spring angle, such as shown in FIG. 1E. The second connector component can now separate from the first connector component. Although not shown, the connector assembly may be connected to at least one article of manufacture. Note that while the disclosed sequence is provided with specificity, it can be practiced in a different order than described.

FIG. 11 is a schematic process flow diagram depicting a method of manufacturing a connector assembly provided in accordance with aspects of the present method, which is generally designated 290. The method comprises the steps of forming a first connector component comprising a groove or a primary groove spaced form a secondary groove at step 292. The method further comprises the step of attaching the first connector component to a first article of manufacture, such as to a chair, a door panel, a picture frame, a flange, a cable, etc. at step 294. At step 296, the method comprises forming a second connector component, such as a pin, comprising the other one of the groove and the primary groove spaced from the secondary groove. At step 298, the method comprises attaching the second connector component to a second article of manufacture. By attaching at steps 294 and 298, the connector components are understood to include being capable of integration or singularly formed with the associated article of manufacture in addition to being capable of attaching in the normal sense, such as through mechanical means. Finally, at step 300, a stop feature is attached or positioned in the first connector component and/or the second connector that requires removal, aligning, circumventing, etc. Note that while the disclosed sequence is provided with specificity, it can be done in a different order than described.

Figure 12A:
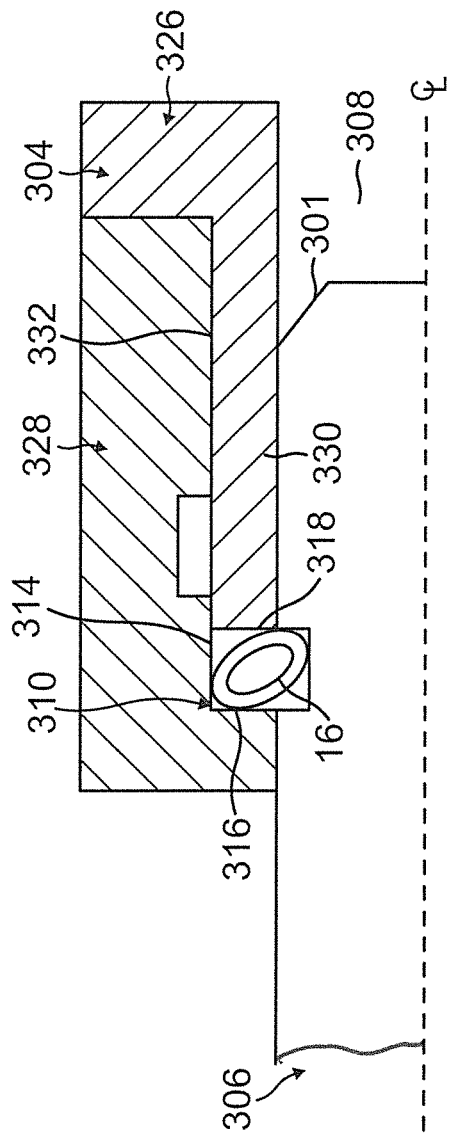
FIGS. 12A-12B are a schematic cross-sectional side views of yet another alternative connector assembly that permits dual direction latching with locking with a groove that changes from a first configuration to a larger second configuration.

FIG. 12A is a cross-sectional side view of yet another connector assembly provided in accordance with aspects of the present device, system, and method, which is generally designated 302 and only partially shown above the centerline, ₵. Like the other connector assemblies and devices discussed elsewhere herein, the present connector assembly has multiple latched positions and a lock position and wherein a stop feature is provided to control movement between the first latched position and the second latched position. As shown, the connector 302 comprises a first connector component 304 and a second connector component 306 with a tapered nose section 301. The two connector components engage one another in the first latched positioned shown in FIG. 12A by moving the second connector component 306 in the first direction 24. Movement of the second connector component 306 in the first direction 24 into the bore 308 causes the spring 16 to latch between the first connector groove 310 and the second connector groove 312, which loads the spring along its major axis, i.e., along the longer axis of the spring coils, so that movement of the second connector component 306 in the second direction 26 is not possible without destroying the spring 16. As shown, the first connector groove 310 comprises a bottom wall 310 generally orthogonal to one or two side walls 316, 318. In other embodiments, both side walls 316 are tapered outwardly in the direction away from the centerline ₵. In other embodiments, the bottom wall 310 is eliminated and the first connector groove is a V-groove. Similarly, the second connector groove 312 has a bottom wall 320 and two side walls 322, 324. In the example shown, the bottom wall 320 is orthogonal to both side walls 322, 324. However, in other embodiments, one or both side walls 322, 324 can be tapered.

With continued reference to FIG. 12A, the first connector component 304 is shown with at least two connector sections that are movable relative to one another, referred to as inner first connector section 326 and outer first connector section 328. The words "inner" and "outer" are relative terms and are used to merely designate two different sections of the first connector component 304. The inner first connector section 326 includes a cylindrical section 330 comprising an interior surface, an exterior surface or perimeter 332, and a rear flange or base 334. Similarly, the outer first connector section 328 comprises a cylindrical section 336 comprising an exterior surface, an interior surface 338, and a front base or flange 340. The inner connector section 326 and the outer connector section 328 are sized and shaped so that the two engage one another telescopically as shown, with the cylindrical section 330 of the inner connector sliding into the cylindrical section 336, which defines an interior bore. Registration of the inner and outer connector sections 326, 328 define the width of the first connector groove 310. Thus, aspect of the present connector is understood to include a first connector groove 310 that is formed, at least in part, by two different first connector sections. As shown in FIG. 12A, the groove 310 is in its engaged configuration.

Figure 12B:
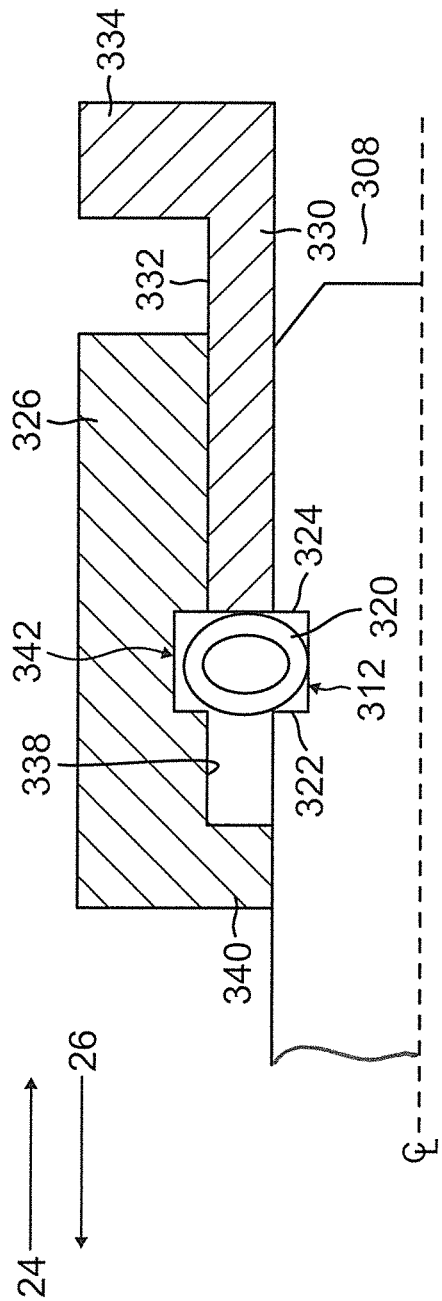

As previously noted, the second connector component 306 cannot retract in the second direction 26 once latched and loaded along the coil's major axis shown in FIG. 12A. However, when the inner and the outer connector sections 326, 328 are retracted away from one another while leaving the first connector component 306 stationary as shown in FIG. 12B, the first connector groove 310 is enlarged and has a groove geometry that is either wider or deeper or both wider and deeper than when the groove 310 is in its engaged configuration, formed with the first and second connectors engaged to one another shown in FIG. 12A. As shown in FIG. 12B, the groove 310 is in its disengaged position, which has at least one side wall or the bottom wall modified by relative movement between the inner and the outer connector sections 326, 328. In one example, the depth of the groove 310 and both side walls are changed by relative movement between the inner and outer connector sections. As shown, a recessed section 342 formed on the interior surface 338 of the outer connector section 328 is moved into alignment with the second connector groove 312 to change the depth of the groove 310. The recessed section 342 can have generally parallel side walls or at least one tapered side wall, which would facilitate rotation of the spring by providing greater clearance. At this point, the spring 16 is permitted to relax and rotate to its second latched position. As discussed elsewhere herein, the second connector component 306 can now move in the second direction 26 to separate from the first connector component.

In one exemplary embodiment, the bore 308 is hollow without an end wall. In another example, a bore end wall (not shown) similar to that of FIG. 2A is incorporated so that once latched in the first latched position shown in FIG. 12A, the second connector component 306 cannot advance further into the bore due to the bore end wall. In another example, a key and keyway combination is incorporated between the first connector component and the second connector component to prevent further insertion of the first connector component into the bore 308 when in the first latched position. In another example, other stop features are incorporated to prevent further insertion of the first connector component into the bore 308 when in the first latched position, such as one of the other stop features discussed elsewhere herein.

While not shown, it is understood that fastening means or other retention mechanisms are used to maintain the first and second connector sections 326, 328 in the engaged position to prevent unwanted or accidental disengagement. In one example, the first connector component 326 is spring loaded (not shown) so that once disengaged as shown in FIG. 12B, the spring (not shown) pushes the connector component 326 back to its engaged position. In still another example, the first connector component incorporates flange sections (not shown) that can retract radially relative to the centerline to enlarge the groove 310. Of course, the first connector component 326 can incorporate structure or structures that move axially and radially to enlarge the groove 310.

Thus, aspects of the present connector assembly is understood to include a first connector component and a second connector component comprising multi-latch positions and wherein the first connector component comprises a groove that can enlarge to permit spring rotation. An aspect of the present embodiment is further understood to include a connector comprising a first connector component and a second connector component with a first latched position and which locks the second connector component in the second direction but permits movement in the second direction by holding the second connector component stationary while enlarging a groove in the first connector component. In a specific example, the groove is enlarged by moving inner and outer connector sections that form the first connector component relative to one another.

Although limited embodiments of dual directional latch connectors with locking and assemblies and their components have been specifically described and illustrated herein, many modifications and variations will be apparent to those skilled in the art. For example, the various connector components may be used with other articles of manufacture not specifically discussed herein but are understood to be usable therewith as means for removably attaching one article to another article during the course of fabricating, manufacturing, or assembling the articles. Furthermore, it is understood and contemplated that features specifically discussed for one connector or assembly may be adopted for inclusion with another connector or assembly provided the functions are compatible. For example, while the various first connector components are discussed with a single groove and the various second connector components are discussed with a primary groove and a secondary groove, the reverse arrangement is possible wherein the first connector components have the primary and secondary grooves while the second connector component has a single groove. Also, the groove geometries, such as using a flat bottom groove, a V-groove, a groove with tapered side wall or walls, etc., may be modified without deviating from the spirit of the present disclosure provided the pin can be locked to a housing but removable by allowing the spring to rotate following its locked state, such as by moving the spring from one common groove to a second larger common groove or enlarging the first common groove. Still furthermore, wherein the disclosure describes moving a component in a first direction or a second direction, it is possible to hold one a different component steady while moving another component or moving both components at the same time but relative to one another. Accordingly, it is to be understood that the connector assemblies and their components constructed according to principles of the disclosed device, system, and method may be embodied other than as specifically described herein. The disclosure is also defined in the following claims.

What is claimed is:

1. A connector comprising a first connector component comprising a cylindrical bore with a cylindrical second connector component received in the cylindrical bore, an annular first connector groove located in or on an inner surface of the bore of the first connector component and an annular second connector groove located in or on an outer surface of the second connector component;
   the first connector groove having at least one of a bottom wall and two tapered side walls that are tapered relatively to a lengthwise axis of the first connector component;
   the first connector groove of the first connector component and the second connector grove of the second connector component defining a first common groove having a first common groove shape and size;
   an additional annular groove located on the first or second connector component adjacent one of the first connector groove and the second connector groove; the first connector groove or the second connector groove together with the additional groove defining a second common groove having a second common groove shape and size;
   a canted coil spring positioned in the first common groove and loaded along a major axis of the canted coil spring in a first position, the canted coil spring being positionable in the second common groove in a second position in which the canted coil spring is not loaded along the major axis;
   a removable stop feature comprising a removable or a multi-part shoulder member having opposing first and second surfaces positioned on the second connector component with the first surface abutting the first connector component to prevent the canted coil spring from moving to the second position from the first position; and
   an extended feature extending from the outer surface of the second connector component having a surface for abutting the second surface of the removable stop feature to prevent relative movement of the second component into the first component when the canted coil spring is in the first position.

2. The connector of claim 1, wherein the additional annular groove is located in the cylindrical bore of the first connector component.

3. The connector of claim 1, wherein the canted coil spring is rotatable when in the second position.

4. The connector of claim 1, further comprising an implantable medical device and wherein the first connector component is located in a header of the implantable medical device.

5. The connector of claim 1, wherein the extended feature is a flange, a pin, a rod, or a sleeve.

6. A connector comprising a first connector component comprising a cylindrical bore mated with a cylindrical second connector component received in the cylindrical bore, an annular first connector groove provided in or on an inner surface of the bore of the first connector component and an annular second connector groove provided in or on an outer surface of the second connector component; the first connector groove of the first connector component and the second connector groove of the second connector component defining a first common groove having a first common groove shape and size;

an additional annular groove located on the first or second connector component adjacent one of the first connector groove and the second connector groove; the first connector groove or the second connector groove together with the additional groove defining a second common groove having a second common groove shape and size;

a canted coil spring positioned in the first common groove and loaded along its major axis in a first position, and is positionable in the second common groove in a second position;

a stop feature comprising abutting surfaces disposed on the first and second connector components to prevent relative movement between the connector components to thereby prevent the canted coil spring from moving to the second common groove, said abutting surfaces comprising a surface on an extended feature extending from the outer surface of the second connector component being blocked by another surface disposed on the first connector component; and wherein the canted coil spring is not loaded along its major axis and is rotatable to its relaxed position inside the second common groove when the extended feature is aligned with a keyway or recess in the first connector component allowing the canted coil spring to be moved to the second common groove such that the surface of the extended feature on the second connector component is no longer blocked by the another surface.

7. The connector of claim 6, wherein the extended feature is a flange, a pin, a rod, or a sleeve.

8. The connector of claim 6, wherein the extended feature abuts against the first connector component to limit movement of the first connector component in a first direction towards the second connector component when the canted coil spring is in the second common groove but not in a second direction, opposite the first direction.

\* \* \* \* \*

UNITED STATES PATENT AND TRADEMARK OFFICE
CERTIFICATE OF CORRECTION

PATENT NO. : 9,677,587 B2  
APPLICATION NO. : 13/693296  
DATED : June 13, 2017  
INVENTOR(S) : Derek Changsrivong et al.

It is certified that error appears in the above-identified patent and that said Letters Patent is hereby corrected as shown below:

In Column 1, Line 58, delete ""locker"" and insert -- "locked" --, therefor.

In Column 14, Line 58, delete "26" and insert -- 126 --, therefor.

In Column 18, Line 59, delete "across-sectional" and insert -- a cross-sectional --, therefor.

In Column 21, Line 6, delete "circumvented. etc." and insert -- circumvented, etc., --, therefor.

In Column 21, Line 32, delete "etc." and insert -- etc., --, therefor.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*